US012562953B2

(12) United States Patent
Ichimaru

(10) Patent No.: US 12,562,953 B2
(45) Date of Patent: Feb. 24, 2026

(54) IN-VEHICLE DEVICE, MANAGEMENT DEVICE, DETERIORATION DETERMINATION METHOD, CHANGE FACTOR DISCRIMINATION METHOD, ABNORMALITY FACTOR DISCRIMINATION METHOD, AND STORAGE MEDIUM FOR NETWORK PATH DETERIORATION DETECTION IN VEHICLES

(71) Applicant: SUMITOMO ELECTRIC INDUSTRIES, LTD., Osaka (JP)

(72) Inventor: Toshihiro Ichimaru, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 248 days.

(21) Appl. No.: 17/796,485

(22) PCT Filed: Oct. 30, 2020

(86) PCT No.: PCT/JP2020/040818
§ 371 (c)(1),
(2) Date: Jul. 29, 2022

(87) PCT Pub. No.: WO2021/152946
PCT Pub. Date: Aug. 5, 2021

(65) Prior Publication Data
US 2023/0353446 A1 Nov. 2, 2023

(30) Foreign Application Priority Data
Jan. 29, 2020 (JP) ................................. 2020-012081

(51) Int. Cl.
*H04L 43/08* (2022.01)
*H04L 9/40* (2022.01)
(Continued)

(52) U.S. Cl.
CPC .......... *H04L 41/0604* (2013.01); *H04L 43/08* (2013.01); *H04L 63/1458* (2013.01); *H04L 67/12* (2013.01)

(58) Field of Classification Search
CPC . H04L 41/0604; H04L 43/08; H04L 63/1458; H04L 12/28; H04L 43/0847; H04L 41/12; H04L 41/147; H04W 24/00
See application file for complete search history.

(56) References Cited

U.S. PATENT DOCUMENTS

| 9,319,264 B1* | 4/2016 | Poutievski .......... H04L 67/1042 |
| 2014/0274048 A1* | 9/2014 | Lavi ...................... H04W 48/04 |
| | | 455/435.1 |

(Continued)

FOREIGN PATENT DOCUMENTS

| CN | 104228715 A | 12/2014 |
| CN | 107271839 A | 10/2017 |

(Continued)

*Primary Examiner* — Muhammad Raza
(74) *Attorney, Agent, or Firm* — Oliff PLC

(57) ABSTRACT

An in-vehicle device includes: a measurement unit configured to measure a characteristic of a transmission path in an in-vehicle network mounted to the vehicle; an acquisition unit configured to acquire deterioration information which is information regarding deterioration of the transmission path and which corresponds to the characteristic measured by the measurement unit; and a determination unit configured to determine a deterioration degree of the transmission path, based on the characteristic measured by the measurement unit and the deterioration information acquired by the acquisition unit.

1 Claim, 13 Drawing Sheets

(51) Int. Cl.
 *H04L 41/0604* (2022.01)
 *H04L 67/12* (2022.01)

(56) References Cited

U.S. PATENT DOCUMENTS

| | | | | |
|---|---|---|---|---|
| 2014/0380416 A1* | 12/2014 | Adachi | H04L 63/20 | |
| | | | 726/2 | |
| 2015/0295774 A1* | 10/2015 | Pugaczewski | H04L 41/12 | |
| | | | 370/254 | |
| 2017/0134215 A1* | 5/2017 | Chini | H04L 41/0631 | |
| 2017/0292983 A1* | 10/2017 | Wortberg | G01R 31/007 | |
| 2021/0034744 A1* | 2/2021 | Inoue | G06F 21/554 | |
| 2021/0044612 A1* | 2/2021 | Kawauchi | B60W 50/0225 | |
| 2021/0045055 A1* | 2/2021 | Winson | H04W 52/0219 | |
| 2021/0127268 A1* | 4/2021 | Franyie Quintana | | |
| | | | H04W 12/60 | |
| 2021/0185070 A1* | 6/2021 | Jeon | H04L 12/66 | |
| 2022/0080786 A1* | 3/2022 | Iizuka | B60C 23/0474 | |

FOREIGN PATENT DOCUMENTS

| | | | |
|---|---|---|---|
| JP | 2012-90193 A | 5/2012 | |
| JP | 2014-232351 A | 12/2014 | |
| JP | 2016-143963 A | 8/2016 | |
| JP | 2017-092621 A | 5/2017 | |

* cited by examiner

FIG.5

| | MASTER DEVICE | | | SLAVE DEVICE | | | TARGET ETHERNET CABLE | | CHARACTERISTIC | DETERIORATION CORRESPONDENCE INFORMATION |
|---|---|---|---|---|---|---|---|---|---|---|
| | MANUFAC-TURER OF CHIP | MANUFAC-TURER OF CIRCUIT | MANUFAC-TURER OF COMMUNICA-TION PORT | MANUFAC-TURER OF CHIP | MANUFAC-TURER OF CIRCUIT | MANUFAC-TURER OF COMMUNICA-TION PORT | MANUFACTURER OF TARGET ETHERNET CABLE | WIRING STATE OF TARGET ETHERNET CABLE | | |
| | MANUFAC-TURED BY COMPANY A | MANUFAC-TURED BY COMPANY A | MANUFAC-TURED BY COMPANY A | MANUFAC-TURED BY COMPANY A | MANUFAC-TURED BY COMPANY A | MANUFAC-TURED BY COMPANY A | MANUFACTURED BY COMPANY A | LENGTH 5m TO 10m | CHARACTERISTIC A | DETERIORATION CORRESPONDENCE INFORMATION A |
| | MANUFAC-TURED BY COMPANY A | MANUFAC-TURED BY COMPANY A | MANUFAC-TURED BY COMPANY A | MANUFAC-TURED BY COMPANY A | MANUFAC-TURED BY COMPANY A | MANUFAC-TURED BY COMPANY A | MANUFACTURED BY COMPANY A | LENGTH 10m TO 15m | CHARACTERISTIC B | DETERIORATION CORRESPONDENCE INFORMATION B |
| | ··· | ··· | ··· | ··· | ··· | ··· | | ··· | ··· | ··· |
| | MANUFAC-TURED BY COMPANY A | MANUFAC-TURED BY COMPANY A | MANUFAC-TURED BY COMPANY A | MANUFAC-TURED BY COMPANY B | MANUFAC-TURED BY COMPANY B | MANUFAC-TURED BY COMPANY B | MANUFACTURED BY COMPANY A | LENGTH 5m TO 10m, HAVING BENT OF RO 1 TO RO 2m | CHARACTERISTIC C | DETERIORATION CORRESPONDENCE INFORMATION C |
| | MANUFAC-TURED BY COMPANY A | MANUFAC-TURED BY COMPANY A | MANUFAC-TURED BY COMPANY A | MANUFAC-TURED BY COMPANY C | MANUFAC-TURED BY COMPANY C | MANUFAC-TURED BY COMPANY C | MANUFACTURED BY COMPANY B | LENGTH 5m TO 10m, HAVING BINDING PLACE OF 1N TO 5N | CHARACTERISTIC D | DETERIORATION CORRESPONDENCE INFORMATION D |
| | MANUFAC-TURED BY COMPANY A | MANUFAC-TURED BY COMPANY A | MANUFAC-TURED BY COMPANY A | MANUFAC-TURED BY COMPANY C | MANUFAC-TURED BY COMPANY C | MANUFAC-TURED BY COMPANY C | MANUFACTURED BY COMPANY B | LENGTH 5m TO 10m, EXTENDING IN PARALLEL TO 5 TO 10 CABLES | CHARACTERISTIC E | DETERIORATION CORRESPONDENCE INFORMATION E |
| | MANUFAC-TURED BY COMPANY A | MANUFAC-TURED BY COMPANY A | MANUFAC-TURED BY COMPANY A | MANUFAC-TURED BY COMPANY C | MANUFAC-TURED BY COMPANY C | MANUFAC-TURED BY COMPANY C | MANUFACTURED BY COMPANY C | LENGTH 5m TO 10m, HAVING 1 TO 3 RELAY PLACES | CHARACTERISTIC F | DETERIORATION CORRESPONDENCE INFORMATION F |
| | MANUFAC-TURED BY COMPANY A | MANUFAC-TURED BY COMPANY B | MANUFAC-TURED BY COMPANY B | MANUFAC-TURED BY COMPANY A | MANUFAC-TURED BY COMPANY A | MANUFAC-TURED BY COMPANY A | MANUFACTURED BY COMPANY C | LENGTH 5m TO 10m | CHARACTERISTIC G | DETERIORATION CORRESPONDENCE INFORMATION G |
| | ··· | ··· | ··· | ··· | ··· | ··· | | ··· | ··· | ··· |

| INSERTION LOSS E | DETERIORATION DEGREE |
|---|---|
| −10dB | ZERO HOURS |
| −15dB | 10000 HOURS |
| −20dB | 30000 HOURS |
| −25dB | 50000 HOURS |
| ⋮ | ⋮ |
| NOT GREATER THAN −50dB | WIRE BREAKAGE STATE |

IN-VEHICLE DEVICE, MANAGEMENT DEVICE, DETERIORATION DETERMINATION METHOD, CHANGE FACTOR DISCRIMINATION METHOD, ABNORMALITY FACTOR DISCRIMINATION METHOD, AND STORAGE MEDIUM FOR NETWORK PATH DETERIORATION DETECTION IN VEHICLES

TECHNICAL FIELD

The present disclosure relates to an in-vehicle device, a management device, a deterioration determination method, a change factor discrimination method, an abnormality factor discrimination method, and an abnormality factor discrimination program. This application claims priority on Japanese Patent Application No. 2020-12081 filed on Jan. 29, 2020, the entire content of which is incorporated herein by reference.

BACKGROUND ART

PATENT LITERATURE 1 (Japanese Laid-Open Patent Publication No. 2016-143963) discloses an in-vehicle communication system as follows. That is, the in-vehicle communication system is an in-vehicle communication system (1) including: a plurality of in-vehicle devices (5) connected so as to be able to communicate with each other via a first bus (7); a second bus (13) to which an extra-vehicular device (9) being a device present outside a vehicle (3) is connected via a connector (11); and a relay device (15) which is connected to the first bus and the second bus, and which relays data communication between the in-vehicle devices and the extra-vehicular device connected to the second bus via the connector. The in-vehicle communication system (1) includes a monitoring device (17) which is connected to the second bus and which detects a DoS attack (Denial Of Service attack) from the extra-vehicular device. When the monitoring device has determined that the DoS attack has occurred, the monitoring device transmits, to the relay device, an attack notification indicating that the DoS attack has occurred (S110 to S150). When the relay device has received the attack notification, the relay device stops the relay (S320, S330).

PATENT LITERATURE 2 (Japanese Laid-Open Patent Publication No. 2012-90193) discloses a failure prediction system as follows. That is, the failure prediction system includes: with respect to a data communication system having a data communication device which transmits/receives data, and a microcontroller which outputs transmission data to the data communication device or to which reception data is inputted from the data communication device, a deterioration determination unit which determines a deterioration advancement degree from an input/output voltage level of the data communication device; and an alarm output unit which outputs an alarm, based on a determination result by the deterioration determination unit.

CITATION LIST

Patent Literature

PATENT LITERATURE 1: Japanese Laid-Open Patent Publication No. 2016-143963
PATENT LITERATURE 2: Japanese Laid-Open Patent Publication No. 2012-90193

SUMMARY OF THE INVENTION

An in-vehicle device of the present disclosure is mounted to a vehicle, and includes: a measurement unit configured to measure a characteristic of a transmission path in an in-vehicle network mounted to the vehicle; an acquisition unit configured to acquire deterioration information which is information regarding deterioration of the transmission path and which corresponds to the characteristic measured by the measurement unit; and a determination unit configured to determine a deterioration degree of the transmission path, based on the characteristic measured by the measurement unit and the deterioration information acquired by the acquisition unit.

An in-vehicle device of the present disclosure is mounted to a vehicle, and includes: a measurement unit configured to measure a characteristic of a transmission path in an in-vehicle network mounted to the vehicle; and a discrimination unit configured to, based on a measurement result of the characteristic by the measurement unit, detect a change in the characteristic, and perform a discrimination process of discriminating a factor of the change.

A management device of the present disclosure includes: an acquisition unit configured to acquire a measurement result of a characteristic of a transmission path in an in-vehicle network mounted to a vehicle, temperature information indicating a temperature of an in-vehicle device connected to the transmission path, and an elapsed time period from a predetermined situation concerning the vehicle; and a discrimination unit configured to perform a discrimination process of discriminating a factor of an abnormality of the transmission path, based on the measurement result, the temperature information, and the elapsed time period, which have been acquired by the acquisition unit.

A deterioration determination method of the present disclosure is performed in an in-vehicle device mounted to a vehicle and includes the steps of: measuring a characteristic of a transmission path in an in-vehicle network mounted to the vehicle; acquiring deterioration information which is information regarding deterioration of the transmission path and which corresponds to the measured characteristic; and determining a deterioration degree of the transmission path, based on the measured characteristic and the acquired deterioration information.

A change factor discrimination method of the present disclosure is performed in an in-vehicle device mounted to a vehicle, and includes the steps of: measuring a characteristic of a transmission path in an in-vehicle network mounted to the vehicle; and detecting a change in the characteristic, based on a measurement result of the characteristic, and performing a discrimination process of discriminating a factor of the change.

An abnormality factor discrimination method of the present disclosure is performed in a management device, and includes the steps of: acquiring a measurement result of a characteristic of a transmission path in an in-vehicle network mounted to a vehicle, temperature information indicating a temperature of an in-vehicle device connected to the transmission path, and an elapsed time period from a predetermined situation concerning the vehicle; and performing a discrimination process of discriminating a factor of an abnormality of the transmission path, based on the measurement result, the temperature information, and the elapsed time period, which have been acquired.

An abnormality factor discrimination program of the present disclosure is used in a management device, and causes a computer to function as: an acquisition unit configured to acquire a measurement result of a characteristic of a transmission path in an in-vehicle network mounted to a vehicle, temperature information indicating a temperature of an in-vehicle device connected to the transmission path, and an elapsed time period from a predetermined situation concerning the vehicle; and a discrimination unit configured to perform a discrimination process of discriminating a factor of an abnormality of the transmission path, based on the measurement result, the temperature information, and the elapsed time period, which have been acquired by the acquisition unit.

One mode of the present disclosure can be realized not only as an in-vehicle device including such a characteristic processing unit, but also as a semiconductor integrated circuit that realizes a part or the entirety of the in-vehicle device, as a program for causing a computer to execute process steps performed in the in-vehicle device, or as a system including the in-vehicle device.

One mode of the present disclosure can be realized not only as a management device including such a characteristic processing unit, but also as a semiconductor integrated circuit that realizes a part or the entirety of the management device, or as a system including the management device.

BRIEF DESCRIPTION OF DRAWINGS

FIG. 5 shows an example of correspondence information in a server according to the first embodiment of the present disclosure.

FIG. 6 shows an example of deterioration correspondence information in the server according to the first embodiment of the present disclosure.

4

Figure 13:
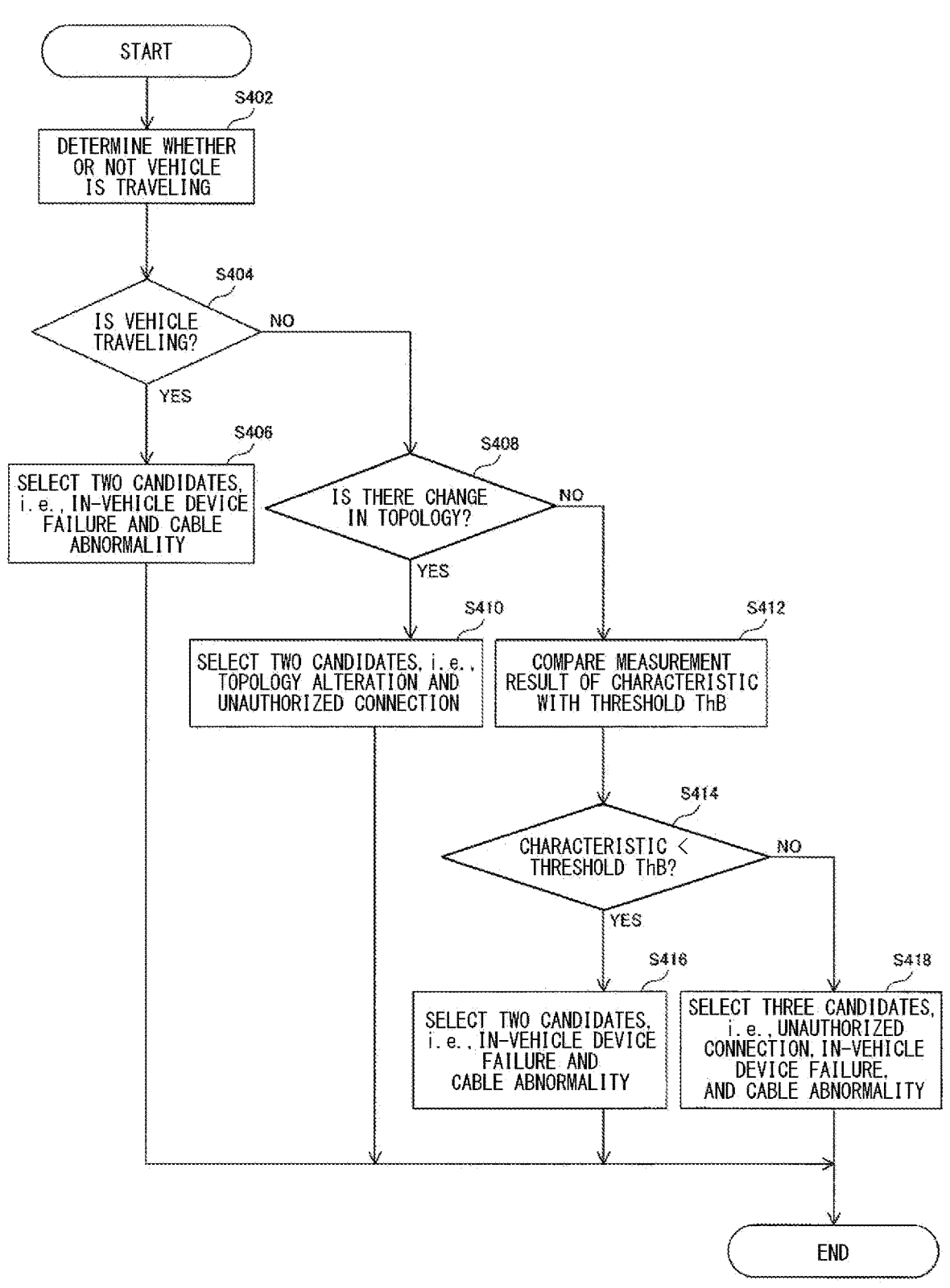

FIG. 13 is a flow chart describing an operation procedure according to which the master device in the in-vehicle communication system according to the second embodiment of the present disclosure performs a discrimination process.

DETAILED DESCRIPTION

To date, a technology that diagnoses and predicts deterioration of an in-vehicle network, and a technology that compensates for distortion of a signal in a transmission line of an in-vehicle network have been known.

Problems to be Solved by the Present Disclosure

Beyond the technologies described in PATENT LITERATURES 1 and 2, a technology that can realize an excellent function regarding a transmission path in an in-vehicle network is desired.

The present disclosure has been made in order to solve the above problem. An object of the present disclosure is to provide an in-vehicle device, a management device, a deterioration determination method, a change factor discrimination method, an abnormality factor discrimination method, and an abnormality factor discrimination program that can realize an excellent function regarding each transmission path in an in-vehicle network.

Effects of the Present Disclosure

According to the present disclosure, an excellent function regarding the transmission path in an in-vehicle network can be realized.

Description of Embodiment of the Present Disclosure

First, contents of embodiments of the present disclosure are listed and described.

(1) An in-vehicle device according to an embodiment of the present disclosure is mounted to a vehicle and includes: measurement unit configured to measure a characteristic of a transmission path in an in-vehicle network mounted to the vehicle; an acquisition unit configured to acquire deterioration information which is information regarding deterioration of the transmission path and which corresponds to the characteristic measured by the measurement unit; and a determination unit configured to determine a deterioration degree of the transmission path, based on the characteristic measured by the measurement unit and the deterioration information acquired by the acquisition unit.

In this configuration, as the deterioration information, for example, deterioration information that corresponds to the manufacturer or the like of the transmission path distinguishable based on a measurement result of a characteristic of the transmission path is acquired, and the deterioration degree of the transmission path is determined based on the measurement result and the acquired deterioration information. Accordingly, for example, the deterioration degree of the transmission path can be accurately determined for each manufacturer of the transmission path. Therefore, an excellent function regarding the transmission path in the in-vehicle network can be realized.

(2) Preferably, the acquisition unit acquires the deterioration information from a device outside the vehicle.

With this configuration, for example, the deterioration degree of the transmission path can be determined by using deterioration information that has been generated or updated, based on information regarding transmission paths in a plurality of vehicles. Therefore, the deterioration degree of the transmission path can be more accurately determined.

(3) Preferably, the acquisition unit acquires, as the deterioration information, deterioration correspondence information indicating a correspondence relationship between the characteristic and the deterioration degree.

With this configuration, the deterioration degree of the transmission path can be determined through a simpler process using the deterioration correspondence information.

(4) An in-vehicle device according to the embodiment of the present disclosure is mounted to a vehicle, and includes: a measurement unit configured to measure a characteristic of a transmission path in an in-vehicle network mounted to the vehicle; and a discrimination unit configured to, based on a measurement result of the characteristic by the measurement unit, detect a change in the characteristic, and perform a discrimination process of discriminating a factor of the change.

In this configuration, the factor of the change in the characteristic of the transmission path is discriminated based on the measurement result of the characteristic of the transmission path. Therefore, for example, wire breakage of the transmission path, a change in the length of the transmission path, and the like can be accurately discriminated as the factor of the change in the characteristic of the transmission path. Therefore, an excellent function regarding the transmission path in the in-vehicle network can be realized.

(5) Preferably, the in-vehicle device further includes a detection unit configured to detect a change in a topology of the in-vehicle network, based on the measurement result of the characteristic by the measurement unit. When a change in the topology has been detected by the detection unit, the discrimination unit determines that a factor of the change is a predetermined factor, irrespective of the measurement result of the characteristic by the measurement unit.

With this configuration, when a change in the topology of the in-vehicle network has been detected, an alteration of the topology, connection of an unauthorized in-vehicle device, and the like can be discriminated as the factor of the change in the characteristic of the transmission path, for example.

(6) Preferably, in the discrimination process, the discrimination unit selects one or a plurality of candidates out of a plurality of candidates of the factor, and when the vehicle is traveling, the discrimination unit excludes a part of the plurality of candidates from a selection target.

With this configuration, factors of a change in the characteristic of the transmission path can be narrowed to factors that can occur during travel of the vehicle.

(7) More preferably, in the discrimination process, the discrimination unit selects one or a plurality of candidates out of a plurality of candidates of the factor, and when the vehicle is traveling, the discrimination unit excludes the predetermined factor from the selection target.

During travel of a vehicle, alteration of the topology of the in-vehicle network 310 and connection of an unauthorized in-vehicle device are less likely to occur. With this configuration, factors of a change in the characteristic of the transmission path can be narrowed to factors other than alteration of the topology and connection of an unauthorized in-vehicle device.

(8) A management device according to the embodiment of the present disclosure includes: an acquisition unit configured to acquire a measurement result of a characteristic of a transmission path in an in-vehicle network mounted to a vehicle, temperature information indicating a temperature of an in-vehicle device connected to the transmission path, and an elapsed time period from a predetermined situation concerning the vehicle; and a discrimination unit configured to perform a discrimination process of discriminating a factor of an abnormality of the transmission path, based on the measurement result, the temperature information, and the elapsed time period, which have been acquired by the acquisition unit.

In this configuration, the factor of an abnormality of the transmission path is discriminated based on the measurement result of the characteristic of the transmission path, the temperature information, and the elapsed time period. Accordingly, for example, factors of abnormalities such as deterioration in a high temperature environment, aged deterioration, and the like can be accurately discriminated. Therefore, an excellent function regarding the transmission path in the in-vehicle network can be realized.

(9) Preferably, the acquisition unit further acquires mounting position information indicating a position in the vehicle of the in-vehicle device connected to the transmission path, and the discrimination unit performs the discrimination process, further based on the mounting position information acquired by the acquisition unit.

With this configuration, the factor of the abnormality can be more accurately discriminated based on the use environment of the transmission path in the vehicle.

(10) Preferably, the acquisition unit further acquires position information of the vehicle and weather information corresponding to the vehicle, and the discrimination unit performs the discrimination process, further based on the position information and the weather information, which have been acquired by the acquisition unit.

With this configuration, the factor of the abnormality can be more accurately discriminated based on the weather information in the use region of the vehicle.

(11) Preferably, the acquisition unit further acquires quality information indicating a communication quality in the transmission path, and the discrimination unit performs the discrimination process, further based on the quality information acquired by the acquisition unit.

With this configuration, the factor of the abnormality can be more accurately discriminated based on a change in the communication quality in the transmission path, for example.

(12) A deterioration determination method according to the embodiment of the present disclosure is performed in an in-vehicle device mounted to a vehicle, and includes the steps of: measuring a characteristic of a transmission path in an in-vehicle network mounted to the vehicle; acquiring deterioration information which is information regarding deterioration of the transmission path and which corresponds to the measured characteristic; and determining a deterioration degree of the transmission path, based on the measured characteristic and the acquired deterioration information.

In this method, as the deterioration information, for example, deterioration information that corresponds to the manufacturer or the like of the transmission path distinguishable based on a measurement result of a characteristic of the transmission path is acquired, and the deterioration degree of the transmission path is determined based on the measurement result and the acquired deterioration information. Accordingly, for example, the deterioration degree of the transmission path can be accurately determined for each manufacturer of the transmission path. Therefore, an excellent function regarding the transmission path in the in-vehicle network can be realized.

(13) A change factor discrimination method according to the embodiment of the present disclosure is performed in an in-vehicle device mounted to a vehicle, and includes the steps of: measuring a characteristic of a transmission path in an in-vehicle network mounted to the vehicle; and detecting a change in the characteristic, based on a measurement result of the characteristic, and performing a discrimination process of discriminating a factor of the change.

In this method, the factor of the change in the characteristic of the transmission path is discriminated based on the measurement result of the characteristic of the transmission path. Therefore, for example, wire breakage of the transmission path, a change in the length of the transmission path, and the like can be accurately discriminated as the factor of the change in the characteristic of the transmission path. Therefore, an excellent function regarding the transmission path in the in-vehicle network can be realized.

(14) An abnormality factor discrimination method according to the embodiment of the present disclosure is performed in a management device, and includes the steps of: acquiring a measurement result of a characteristic of a transmission path in an in-vehicle network mounted to a vehicle, temperature information indicating a temperature of an in-vehicle device connected to the transmission path, and an elapsed time period from a predetermined situation concerning the vehicle; and performing a discrimination process of discriminating a factor of an abnormality of the transmission path, based on the measurement result, the temperature information, and the elapsed time period, which have been acquired.

In this method, the factor of an abnormality of the transmission path is discriminated based on the measurement result of the characteristic of the transmission path, the temperature information, and the elapsed time period. Accordingly, for example, factors of abnormalities such as deterioration in a high temperature environment, aged deterioration, and the like can be accurately discriminated. Therefore, an excellent function regarding the transmission path in the in-vehicle network can be realized.

(15) An abnormality factor discrimination program according to the embodiment of the present disclosure is used in a management device, and causes a computer to function as: an acquisition unit configured to acquire a measurement result of a characteristic of a transmission path in an in-vehicle network mounted to a vehicle, temperature information indicating a temperature of an in-vehicle device connected to the transmission path, and an elapsed time period from a predetermined situation concerning the vehicle; and a discrimination unit configured to perform a discrimination process of discriminating a factor of an abnormality of the transmission path, based on the measurement result, the temperature information, and the elapsed time period, which have been acquired by the acquisition unit.

In this configuration, the factor of an abnormality of the transmission path is discriminated based on the measurement result of the characteristic of the transmission path, the temperature information, and the elapsed time period. Accordingly, for example, factors of abnormalities such as deterioration in a high temperature environment, aged deterioration, and the like can be accurately discriminated. Therefore, an excellent function regarding the transmission path in the in-vehicle network can be realized.

Hereinafter, embodiments of the present disclosure will be described with reference to the drawings. In the drawings, the same or corresponding parts are denoted by the same reference signs, and descriptions thereof are not repeated. At least some parts of the embodiments described below can be combined together as desired.

First Embodiment

[Communication System]

Figure 1:
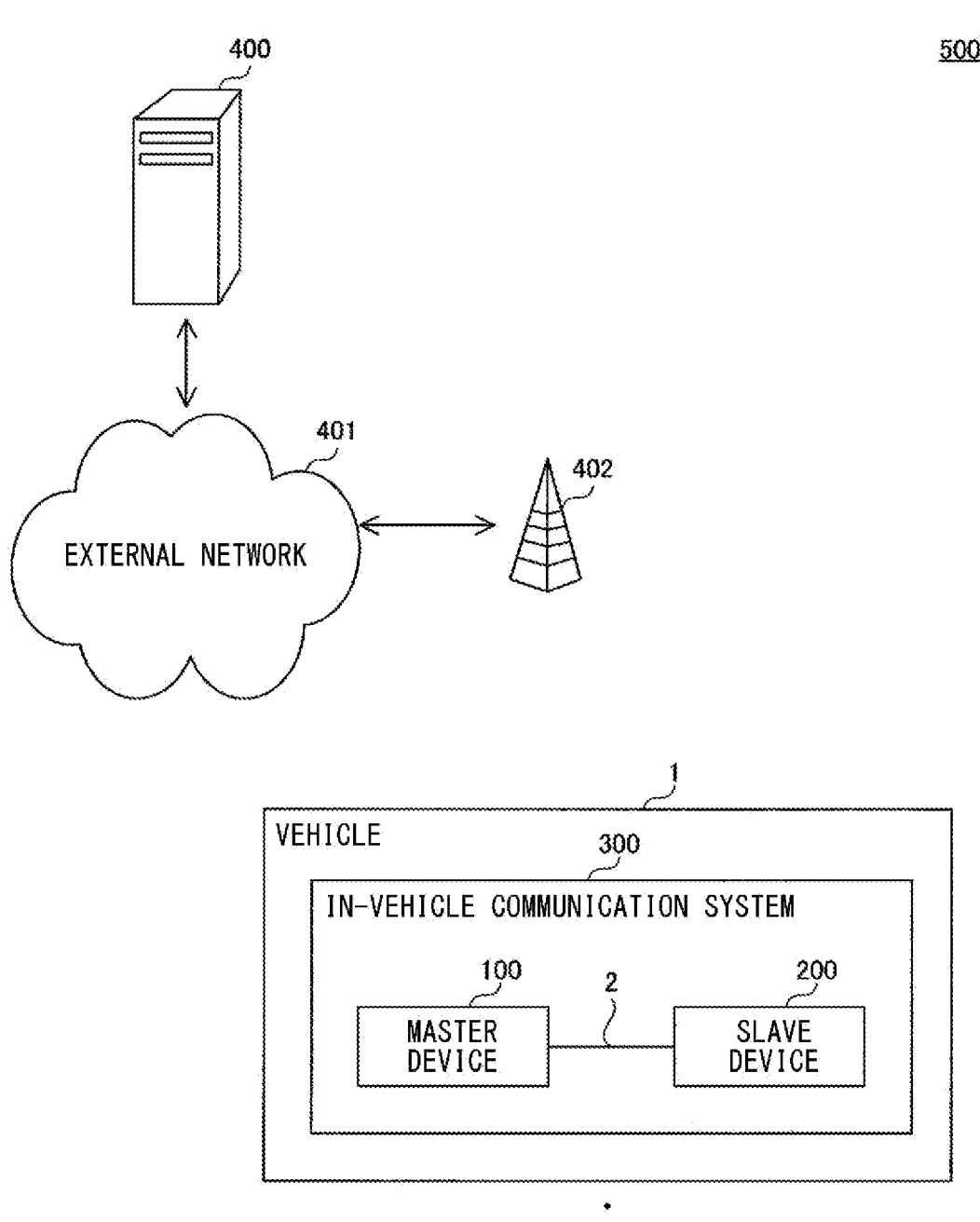
FIG. 1 shows a configuration of a communication system according to a first embodiment of the present disclosure.

FIG. 1 shows a configuration of a communication system according to a first embodiment of the present disclosure.

With reference to FIG. 1, a communication system 500 includes a server 400 and one or a plurality of in-vehicle communication systems 300. Each in-vehicle communication system 300 is mounted to a vehicle 1. The server 400 is an example of a management device.

The server 400 acquires information such as a measurement result of a characteristic of a transmission path 2 in each vehicle 1, and discriminates, based on the acquired information, a factor of an abnormality having occurred in the transmission path 2 of the vehicle 1. Details of the server 400 will be described later.

[in-Vehicle Communication System]

Each in-vehicle communication system 300 includes a master device 100 and a slave device 200. The master device 100 is an example of an in-vehicle device. The master device 100 and the slave device 200 are mounted to the vehicle 1.

The master device 100 and the slave device 200 are connected to each other via a transmission path 2 in an in-vehicle network mounted to the vehicle 1.

The in-vehicle communication system 300 may be configured such that a plurality of slave devices 200 are connected to one master device 100 via corresponding transmission paths 2, or may be configured such that a plurality of master devices 100 are connected to one slave device 200 via corresponding transmission paths 2.

The master device 100 and the slave device 200 can communicate with each other via a transmission path 2.

The transmission path 2 is a differential transmission path, for example. Specifically, the transmission path 2 is an Ethernet (registered trademark) cable, for example.

The master device 100 measures a characteristic of the transmission path 2. For example, the master device 100 measures a transmission characteristic of the transmission path 2. More specifically, the master device 100 measures at least one of characteristic impedance in the transmission path 2 and insertion loss in the transmission path 2.

Figure 2:
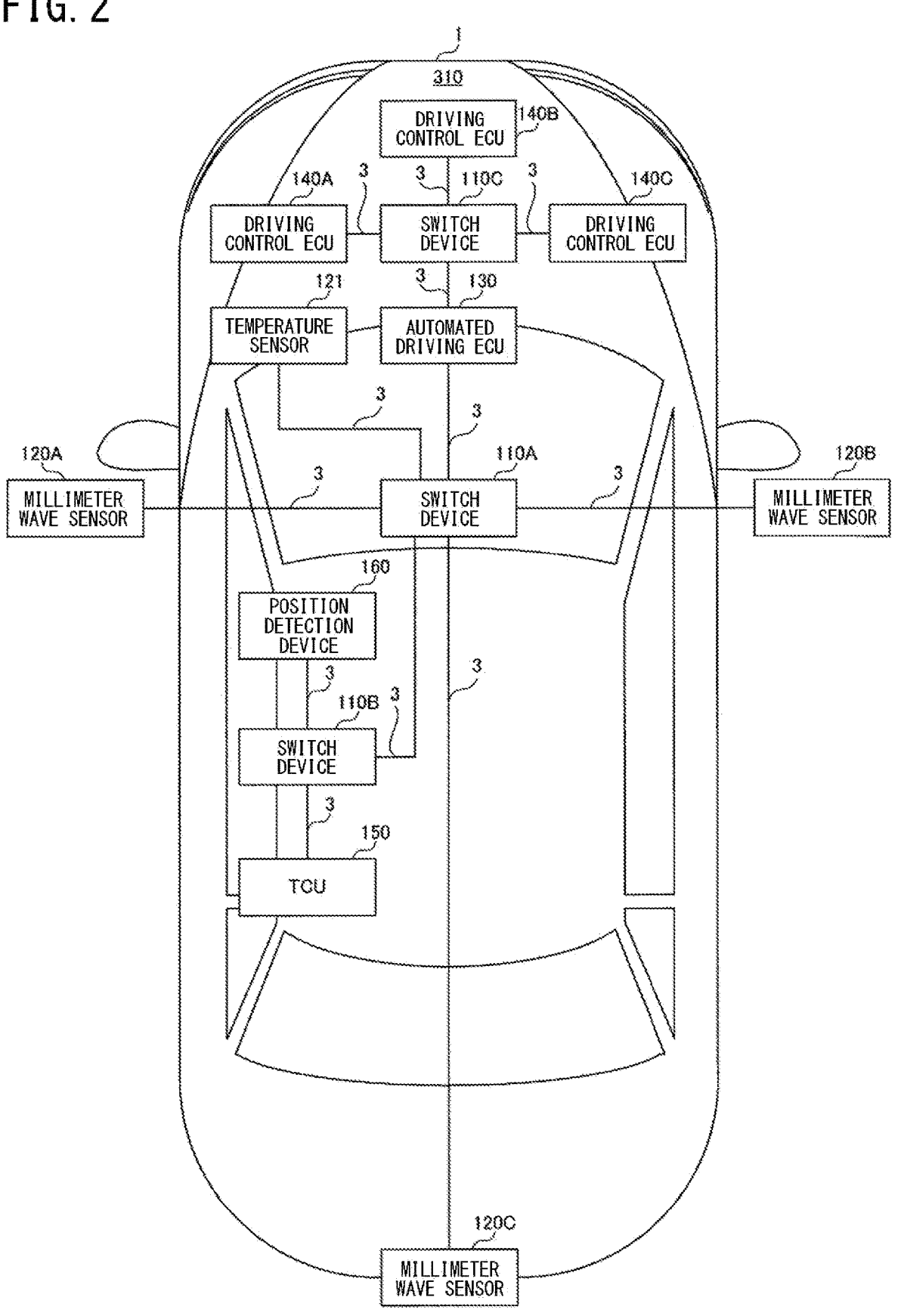
FIG. 2 shows a configuration of an in-vehicle network according to the first embodiment of the present disclosure.

FIG. 2 shows a configuration of the in-vehicle network according to the first embodiment of the present disclosure.

With reference to FIG. 2, the in-vehicle network 310 includes switch devices 110A, 110B, 110C, millimeter wave sensors 120A, 120B, 120C, a temperature sensor 121, an automated driving ECU (Electronic Control Unit) 130, driving control ECUs 140A, 140B, 140C, a TCU 150, and a position detection device 160. The in-vehicle network 310 is mounted to the vehicle 1.

For example, the driving control ECUs 140A, 140B, 140C are an accelerator control ECU, a brake control ECU, and a steering control ECU, respectively.

Hereinafter, each of the switch devices 110A, 110B, 110C will also be referred to as a switch device 110. Each of the millimeter wave sensors 120A, 120B, 120C will also be referred to as a millimeter wave sensor 120. Each of the driving control ECUs 140A, 140B, 140C will also be referred to as a driving control ECU 140.

Each switch device 110, each millimeter wave sensor 120, the temperature sensor 121, the automated driving ECU 130, each driving control ECU 140, the TCU 150, and the position detection device 160 in the in-vehicle network 310 are examples of the in-vehicle device. More specifically, these in-vehicle devices are examples of the master device 100, and examples of the slave device 200.

That is, in this example, each in-vehicle device can operate as a master device 100, and can operate as a slave device 200. Each in-vehicle device may be configured to operate as either one of the master device 100 and the slave device 200.

The connection relationship between the switch devices 110, the millimeter wave sensors 120, the temperature sensor 121, the automated driving ECU 130, the driving control ECUs 140, the TCU 150, and the position detection device 160 in the in-vehicle network 310 is fixed, for example.

The switch device 110A and the switch device 110B are connected to each other via an Ethernet cable 3. The switch device 110A is connected to the millimeter wave sensors 120, the temperature sensor 121, and the automated driving ECU 130 via Ethernet cables 3. The switch device 110B is connected to the TCU 150 and the position detection device 160 via Ethernet cables 3. The switch device 110C is connected to the driving control ECUs 140 and the automated driving ECU 130 via Ethernet cables 3.

In the in-vehicle network 310, data is transmitted and received between in-vehicle devices. Specifically, in the in-vehicle network 310, transmission/reception of an Ethernet frame is performed between in-vehicle devices, according to the communication standard of IEEE802.3, for example.

The in-vehicle network 310 may be configured such that transmission/reception of data is performed between in-vehicle devices, according to a communication standard such as CAN (Controller Area Network) (registered trademark), FlexRay (registered trademark), MOST (Media Oriented Systems Transport) (registered trademark), or LIN (Local Interconnect Network), other than the communication standard of IEEE802.3. That is, the transmission path 2 is not limited to an Ethernet cable 3, and may be a cable of another type.

Each switch device 110 relays an Ethernet frame sent and received between in-vehicle devices.

The TCU 150 can communicate with the server 400 outside the vehicle 1. Specifically, with reference to FIG. 1 and FIG. 2, the TCU 150 can communicate with the server 400 via a wireless base station device 402 by using an IP packet, for example.

More specifically, for example, the TCU 150 can perform wireless communication with the wireless base station device 402 outside the vehicle 1, according to a communication standard such as LTE (Long Term Evolution) or 3G.

Specifically, when the wireless base station device 402 has received an IP packet via an external network 401 from the server 400, the wireless base station device 402 causes the received IP packet to be included in a radio signal, and transmits the radio signal to the TCU 150.

For example, when the TCU 150 has received, from the wireless base station device 402, a radio signal including an IP packet from the server 400, the TCU 150 acquires the IP packet from the received radio signal, stores the acquired IP packet into an Ethernet frame, and transmits the Ethernet frame to the switch device 110B.

Meanwhile, when the TCU 150 has received an Ethernet frame from the switch device 110B, the TCU 150 acquires an IP packet from the received Ethernet frame, causes the acquired IP packet to be included in a radio signal, and transmits the radio signal to the wireless base station device 402.

Upon receiving the radio signal from the TCU 150, the wireless base station device 402 acquires the IP packet from the received radio signal, and transmits the acquired IP packet to the server 400 via the external network 401.

The position detection device 160 periodically or non-periodically acquires the current position of the vehicle 1, based on a radio wave from a positioning satellite of a GNSS (Global Navigation Satellite System) such as GPS (Global Positioning System), and transmits position information indicating the acquired current position to the server 400 via the switch device 110B and the TCU 150.

The temperature sensor 121 periodically or non-periodically measures the temperature in the vehicle 1, and transmits temperature information indicating the measurement result to the server 400 via the switch devices 110A, 110B and the TCU 150.

Each millimeter wave sensor 120 measures the distance, etc., between the vehicle 1 and an object around the vehicle 1, for example, and generates an Ethernet frame including sensor information indicating the measurement result. The millimeter wave sensor 120 transmits the generated Ethernet frame to the automated driving ECU 130 via the switch device 110A.

Upon receiving the Ethernet frame from the millimeter wave sensor 120 via the switch device 110A, the automated driving ECU 130 acquires the sensor information from the received Ethernet frame. The automated driving ECU 130 controls each driving control ECU 140, based on the measurement result indicated by the sensor information.

Specifically, based on the measurement result, the automated driving ECU 130 generates an Ethernet frame including various types of control information for controlling the accelerator, brake, and steering of the vehicle 1, for example, and transmits the generated Ethernet frame to the driving control ECU 140 via the switch device 110C.

Upon receiving the Ethernet frame from the automated driving ECU 130, the driving control ECU 140 acquires control information from the received Ethernet frame. The driving control ECU 140 controls the accelerator, brake, and steering of the vehicle 1, according to the acquired control information.

Upon completion of the control of the accelerator, brake, and steering of the vehicle 1, the driving control ECU 140 generates an Ethernet frame including completion information indicating that the control is completed, and transmits the generated Ethernet frame to the automated driving ECU 130 via the switch device 110C.

[Master Device]

Figure 3:
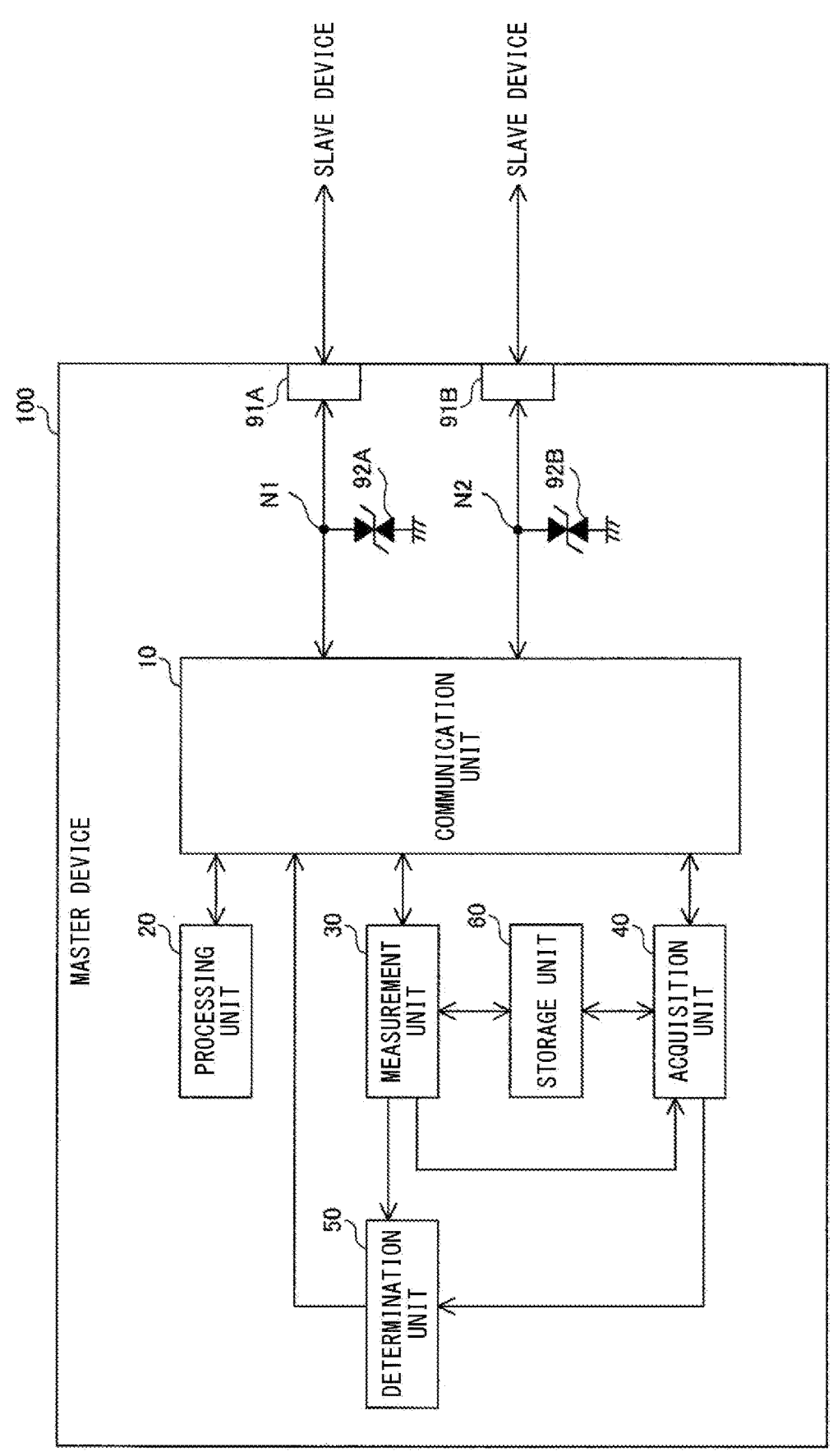
FIG. 3 shows a configuration of a master device according to the first embodiment of the present disclosure.

FIG. 3 shows a configuration of a master device according to the first embodiment of the present disclosure.

With reference to FIG. 3, the master device 100 includes a communication unit 10, a processing unit 20, a measurement unit 30, an acquisition unit 40, a determination unit 50, a storage unit 60, communication ports 91A, 91B, and front end circuits 92A, 92B.

The communication unit 10, the processing unit 20, the measurement unit 30, the acquisition unit 40, and the determination unit 50 are each realized as a processor such as a CPU (Central Processing Unit) or a DSP (Digital Signal Processor), for example. The storage unit 60 is a flash memory, for example. The storage unit 60 has stored therein a shipment time being the time at which the vehicle 1 was shipped from a manufacturing plant.

The communication ports 91A, 91B are each a terminal to which a connector of an Ethernet cable 3 can be connected, for example. Hereinafter, each of the communication ports 91A, 91B will also be referred to as a communication port 91.

The master device 100 need not necessarily be provided with two communication ports 91, and may be provided with one, or three or more communication ports 91. For example, the master device 100 may be provided with communication ports 91 in a number corresponding to the number of in-vehicle devices connected to the master device 100. Specifically, the switch device 110C as an example of the master device 100 includes four communication ports 91 corresponding to the automated driving ECU 130 and the driving control ECUs 140 being in-vehicle devices connected to the switch device 110C.

The front end circuit 92A is connected between a ground node, and a node N1 between the communication port 91A and the communication unit 10. The front end circuit 92B is connected between a ground node, and a node N2 between the communication port 91B and the communication unit 10. Hereinafter, each of the front end circuits 92A, 92B will also be referred to as a front end circuit 92. Each front end circuit 92 is implemented by a bidirectional zener diode, for example.

The processing unit 20 outputs, to the communication unit 10, an Ethernet frame that should be transmitted to another in-vehicle device.

For example, the processing unit 20 in a millimeter wave sensor 120 generates an Ethernet frame including sensor information showing a measurement result, and outputs the generated Ethernet frame to the communication unit 10. For example, in the automated driving ECU 130 as a master device 100, an Ethernet frame including various types of control information is generated, and the generated Ethernet frame is outputted to the communication unit 10.

The communication unit 10 communicates with another in-vehicle device via an Ethernet cable 3 connected to the communication unit 10.

More specifically, the communication unit 10 transmits an Ethernet frame received from the processing unit 20, to an in-vehicle device corresponding to the destination MAC (Media Access Control) address included in the Ethernet frame, via a corresponding communication port 91.

Meanwhile, when the communication unit 10 has received an Ethernet frame addressed to the master device 100 via a communication port 91 from another in-vehicle device, the communication unit 10 outputs the received Ethernet frame to the processing unit 20.

Upon receiving the Ethernet frame from the communication unit 10, the processing unit 20 performs a predetermined process by using the received Ethernet frame.

For example, based on a measurement result indicated by sensor information included in an Ethernet frame from a millimeter wave sensor 120, the processing unit 20 in the automated driving ECU 130 performs a process of generating an Ethernet frame including various types of control information. Then, the processing unit 20 transmits the generated Ethernet frame to another in-vehicle device, i.e., a driving control ECU 140, via the communication unit 10 and a communication port 91.

Alternatively, for example, the processing unit 20 in each switch device 110 performs a process of relaying an Ethernet frame. Specifically, when the processing unit 20 has received an Ethernet frame via a communication port 91 and the communication unit 10 from a transmission source in-vehicle device, the processing unit 20 transmits the received Ethernet frame to the destination in-vehicle device via the communication unit 10 and a communication port 91.

Each slave device 200 has the same configuration as that of the master device 100 except that the slave device 200 is not provided with the measurement unit 30, the acquisition unit 40, and the determination unit 50.

[Measurement Unit]

With reference to FIG. 2 and FIG. 3 again, for example, the measurement unit 30 periodically or non-periodically measures the communication quality in a transmission path 2, i.e., an Ethernet cable 3, that connects a slave device 200 to the master device 100 being the in-vehicle device to which the measurement unit 30 belongs. Hereinafter, the Ethernet cable 3 that connects a master device 100 and a slave device 200 to each other will also be referred to as a "target cable 3".

More specifically, as the communication quality in the target cable 3, the measurement unit 30 measures an SN (Signal-Noise) ratio of communication in the target cable 3 or a BER (Bit Error Rate) of communication in the target cable 3, generates quality information indicating the measurement result of the communication quality, and stores the generated quality information into the storage unit 60.

The measurement unit 30 measures a characteristic of a transmission path 2, i.e., an Ethernet cable 3, in the in-vehicle network 310. More specifically, the measurement unit 30 measures a characteristic of a target cable 3, e.g., a transmission characteristic.

The measurement unit 30 measures the characteristic of the target cable 3 according to a predetermined measurement trigger such as turning-on of an accessory power supply of the vehicle 1, turning-on of an ignition power supply of the vehicle 1, initialization of an in-vehicle device, a configuration alteration of the in-vehicle network 310, or occurrence of a communication error in the in-vehicle network 310. The measurement unit 30 may periodically measure the characteristic of the target cable 3.

For example, as a characteristic of the target cable 3, the measurement unit 30 measures characteristic impedance in the target cable 3.

More specifically, in a state where termination processing has been performed in a slave device 200, the measurement unit 30 measures the characteristic impedance in the target cable 3 by using a technique according to TDR (Time Domain Reflectometry).

Specifically, the measurement unit 30 outputs a signal for measurement such as a high-speed pulse signal or a step signal to the target cable 3 via the communication unit 10 and a communication port 91, and receives a reflection signal with respect to the outputted signal for measurement via the communication port 91 and the communication unit 10.

Then, based on the received reflection signal, the measurement unit 30 measures the characteristic impedance in the target cable 3.

Alternatively, the measurement unit 30 measures insertion loss in the target cable 3, as a characteristic of the target cable 3.

More specifically, in a state where termination processing has been performed in a slave device 200, the measurement unit 30 transmits, via the communication unit 10 and a communication port 91, a plurality of signals for measurement having different frequencies to the slave device 200 connected to the measurement unit 30 via a target cable 3.

The slave device 200 measures the signals for measurement received from the measurement unit 30 in the master device 100, and transmits a response signal indicating the measurement result, to the master device 100.

Upon receiving the response signal from the slave device 200 via the target cable 3, the communication port 91, and the communication unit 10, the measurement unit 30 in the master device 100 measures insertion loss in the target cable 3 by using the received response signal and the signals for measurement transmitted by the measurement unit 30.

The measurement unit 30 need not necessarily measure the characteristic impedance or the insertion loss in the target cable 3, as the characteristic of the target cable 3. As the characteristic of the target cable 3, the measurement unit 30 may measure both of the characteristic impedance and the insertion loss in the target cable 3, or may measure at least one of reflection loss and S-parameters in the target cable 3. The characteristic impedance, the insertion loss, the reflection loss, and the S-parameters are examples of the transmission characteristic.

After measuring the characteristic of the target cable 3, the measurement unit 30 transmits a test frame to the slave device 200 via the communication unit 10.

Upon receiving the test frame from the measurement unit 30 in the master device 100, the slave device 200 generates a response frame including the ID of the slave device 200, such as the IP address and the MAC address of the slave device 200, and transmits the generated response frame to the master device 100.

Upon receiving the response frame from the slave device 200 via the communication unit 10, the measurement unit 30 in the master device 100 acquires the ID of the slave device 200 from the received response frame.

Then, the measurement unit 30 generates measurement information including the ID of the master device 100, the ID of the slave device 200, and the measurement result of the characteristic of the target cable 3, and outputs the generated measurement information to the acquisition unit 40 and the determination unit 50. Hereinafter, the ID of the master device 100 will also be referred to as a master ID, and the ID of the slave device 200 will also be referred to as a slave ID.

When the measurement unit 30 has failed to receive the response frame, or when the measurement unit 30 has failed to acquire the slave ID from the response frame, the measurement unit 30 generates measurement information not including the slave ID and including the master ID and the measurement result of the characteristic of the target cable 3, and outputs the measurement information to the acquisition unit 40 and the determination unit 50.

In addition, based on the shipment time and the current time in the storage unit 60, the measurement unit 30 calculates an elapsed time period from the time point at which the vehicle 1 was shipped from the manufacturing plant.

Then, the measurement unit 30 acquires quality information from the storage unit 60, generates vehicle measurement information including the acquired quality information, the calculated elapsed time period, and the measurement information, and transmits the generated vehicle measurement information to the server 400 via the communication unit 10, the TCU 150, and the wireless base station device 402.

For example, at a timing according to the measurement trigger described above, the measurement unit 30 transmits vehicle measurement information to the server 400.

[Acquisition Unit]

The acquisition unit 40 acquires deterioration information which is information regarding deterioration of a transmission path 2, i.e., an Ethernet cable 3, and which corresponds to the characteristic measured by the measurement unit 30.

For example, the acquisition unit 40 acquires, as the deterioration information, deterioration correspondence information T2 indicating the correspondence relationship between the characteristic of the target cable 3 and the deterioration degree of the target cable 3.

For example, the acquisition unit 40 acquires the deterioration correspondence information T2 from a device, e.g., the server 400, outside the vehicle 1.

More specifically, before shipment of the vehicle 1, the acquisition unit 40 generates a deterioration information request including a measurement result of the characteristic of the target cable 3, and transmits the generated deterioration information request to the server 400 via the communication unit 10, the TCU 150, and the wireless base station device 402.

Upon receiving the deterioration information request from the measurement unit 30 in the master device 100 in the in-vehicle communication system 300, the server 400 transmits deterioration correspondence information that corresponds to the measurement result indicated by the received deterioration information request, to the master device 100 in the in-vehicle communication system 300 via the wireless base station device 402 and the TCU 150.

More specifically, the server 400 retains correspondence information indicating the correspondence relationship between characteristics of Ethernet cables 3 and deterioration correspondence information T2.

Here, each Ethernet cable 3 has a unique characteristic corresponding to the manufacturer and the wiring state of the Ethernet cable 3 in the in-vehicle network 310. The wiring state of the Ethernet cable 3 in the in-vehicle network 310 means, for example, the length, the curvature radius, force due to binding with another Ethernet cable 3, the length of the portion extending in parallel to another Ethernet cable 3 due to binding, and the presence/absence of a relay terminal, of the Ethernet cable 3 wired in the in-vehicle network 310.

Figure 4:
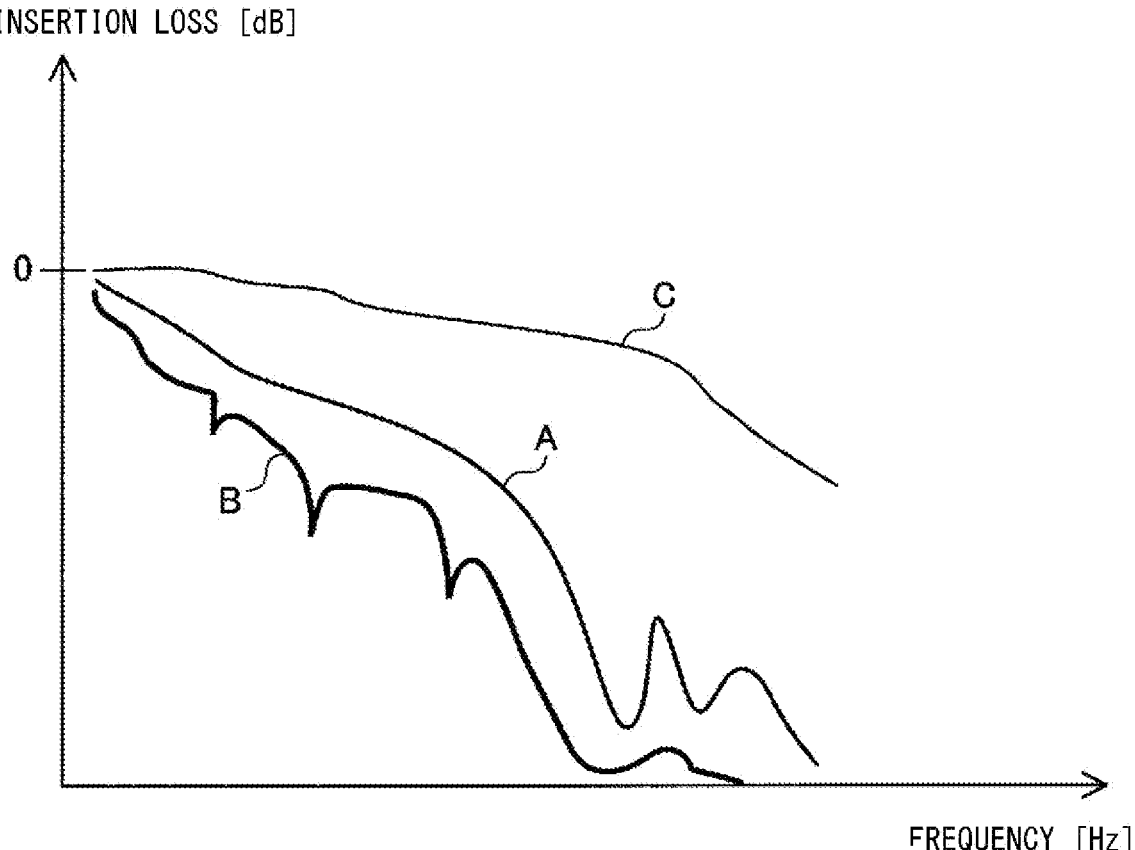
FIG. 4 shows an example of a measurement result of insertion loss in an Ethernet cable in an in-vehicle communication system according to the first embodiment of the present disclosure.

FIG. 4 shows an example of a measurement result of the insertion loss in an Ethernet cable in the in-vehicle communication system according to the first embodiment of the present disclosure. In FIG. 4, the vertical axis represents the insertion loss [dB] and the horizontal axis represents the frequency [Hz] of a target signal.

With reference to FIG. 4, an insertion loss waveform A represents the insertion loss in an Ethernet cable 3A manufactured by company X and having a length of 10 m. An insertion loss waveform B represents the insertion loss in an Ethernet cable 3B manufactured by company X, having a length of 10 m, and extending in parallel to another Ethernet cable. An insertion loss waveform C represents the insertion loss in an Ethernet cable 3C manufactured by company X and having a length of 5 m. As shown, the waveforms of the insertion loss of the Ethernet cables 3 are different according to the length and the wiring state of the Ethernet cables 3.

The measurement result of the characteristic of a target cable 3 by the measurement unit 30 in a master device 100 is influenced according to the difference in the manufacturer of a chip in the master device 100, the difference in the manufacturer of a circuit in the master device 100, the difference in the manufacturer of a communication port 91 in the master device 100, the difference in the manufacturer of a chip in a slave device 200, the difference in the manufacturer of a circuit in the slave device 200, the difference in the manufacturer of a communication port 91 in the slave device 200, and the difference in the manufacturer of an Ethernet cable 3.

Therefore, as the correspondence information, the server 400 retains correspondence information T1 indicating the correspondence relationship between deterioration correspondence information and a plurality of characteristics according to the manufacturers of units in the master device 100, the manufacturers of units in the slave device 200, the manufacturers of Ethernet cables 3, and the wiring states of the Ethernet cables 3.

FIG. 5 shows an example of the correspondence information in the server according to the first embodiment of the present disclosure.

With reference to FIG. 5, when the server 400 has received a deterioration information request from the measurement unit 30 in the master device 100 in the in-vehicle communication system 300, the server 400 specifies a characteristic that matches or that is similar to the measurement result indicated by the received deterioration information request out of the characteristics in the correspondence information T1 retained by the server 400, and acquires deterioration correspondence information that corresponds to the specified characteristic.

FIG. 6 shows an example of the deterioration correspondence information in the server according to the first embodiment of the present disclosure. FIG. 6 shows deterioration correspondence information T2 showing the correspondence relationship between insertion loss E and deterioration degree. In the deterioration correspondence information T2, the deterioration degree is represented by a corresponding aged deterioration time period or wire breakage state.

The server 400 transmits the acquired deterioration correspondence information T2 to the master device 100 in the in-vehicle communication system 300 via the wireless base station device 402 and the TCU 150.

When the acquisition unit 40 in the master device 100 has received the deterioration correspondence information T2 from the server 400 via the TCU 150 and the communication unit 10, the acquisition unit 40 stores the received deterioration correspondence information T2 into the storage unit 60.

Then, when the acquisition unit 40 has received measurement information from the measurement unit 30 after shipment of the vehicle 1, the acquisition unit 40 acquires the deterioration correspondence information T2 from the storage unit 60 and outputs the deterioration correspondence information T2 to the determination unit 50.

The acquisition unit 40 may periodically or non-periodically acquire the deterioration correspondence information T2 from the server 400 after shipment of the vehicle 1. For example, when the topology of the in-vehicle network 310 has been altered, the acquisition unit 40 acquires deterioration correspondence information T2 from the server 400.

When the acquisition unit 40 has acquired deterioration correspondence information T2 from the server 400 after shipment of the vehicle 1, the acquisition unit 40 updates the deterioration correspondence information T2 in the storage unit 60 to the newly acquired deterioration correspondence information T2.

[Determination Unit]

The determination unit 50 determines the deterioration degree of a transmission path 2 based on the characteristic measured by the measurement unit 30 and the deterioration information acquired by the acquisition unit 40.

For example, the determination unit 50 determines the deterioration degree of the target cable 3, based on the measurement information received from the measurement unit 30 and the deterioration information, e.g., the deterioration correspondence information T2 received from the acquisition unit 40.

More specifically, the determination unit 50 specifies, in the deterioration correspondence information T2, a deterioration degree that corresponds to the insertion loss E that is closest to the value of the insertion loss indicated by the measurement information received from the measurement unit 30.

The determination unit 50 notifies a user of the specified deterioration degree by means of a display or a sound output in the vehicle 1, and notifies the server 400 of the specified deterioration degree via the communication unit 10 and the TCU 150.

[Server]

Figure 7:
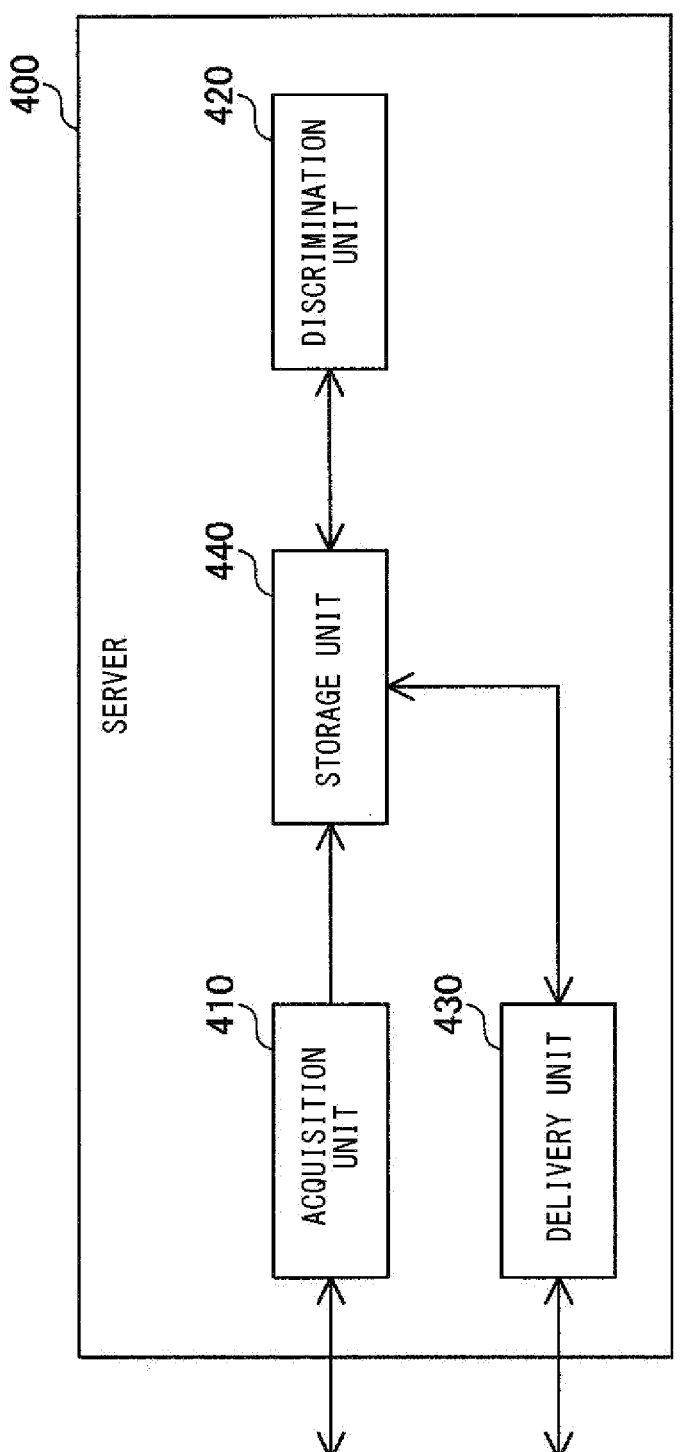
FIG. 7 shows a configuration of the server according to the first embodiment of the present disclosure.

FIG. 7 shows a configuration of the server according to the first embodiment of the present disclosure.

With reference to FIG. 7, the server 400 includes an acquisition unit 410, a discrimination unit 420, a delivery unit 430, and a storage unit 440. The storage unit 440 is a flash memory, for example.

With reference to FIG. 5 again, the storage unit 440 has stored therein the correspondence information T1. In addition, for example, the storage unit 440 stores therein, for each vehicle type of the vehicle 1, an ID of each in-vehicle device in the in-vehicle network 310 and connection information indicating the connection relationship of each in-vehicle device.

[Delivery Unit]

With reference to FIG. 5 and FIG. 6 again, when the delivery unit 430 has received a deterioration information request from the measurement unit 30 in the master device 100 in the in-vehicle communication system 300, the delivery unit 430 specifies a characteristic that matches or that is similar to the measurement result indicated by the received deterioration information request, out of the characteristics in the correspondence information T1 in the storage unit 440, and acquires deterioration correspondence information T2 that corresponds to the specified characteristic.

For example, when the delivery unit 430 has received a deterioration information request including an insertion loss waveform of an Ethernet cable 3, the delivery unit 430 compares the insertion loss corresponding to each frequency, in the insertion loss waveform indicated by the received deterioration information request and each insertion loss waveform in the correspondence information T1, thereby specifying an insertion loss waveform that matches or that is similar to the insertion loss waveform indicated by the received deterioration information request, out of the insertion loss waveforms in the correspondence information T1. Then, the delivery unit 430 acquires deterioration correspondence information T2 that corresponds to the specified insertion loss waveform.

The delivery unit 430 transmits the acquired deterioration correspondence information T2 to the master device 100 in the in-vehicle communication system 300 via the wireless base station device 402 and the TCU 150.

[Acquisition Unit]

The acquisition unit 410 acquires a measurement result of the characteristic of a transmission path 2 in the in-vehicle network 310 mounted to the vehicle 1, temperature information indicating the temperature of an in-vehicle device connected to the transmission path 2, and an elapsed time period from a predetermined situation concerning the vehicle 1. More specifically, as the elapsed time period from the predetermined situation concerning the vehicle 1, the acquisition unit 410 acquires an elapsed time period from the time point at which the vehicle 1 was shipped from a manufacturing plant. For example, as the measurement result of the characteristic of the transmission path 2, the acquisition unit 410 acquires a measurement result of a transmission characteristic of the transmission path 2.

For example, the acquisition unit 410 further acquires mounting position information indicating the position, in the vehicle 1, of the in-vehicle device connected to the transmission path 2, position information of the vehicle 1 and weather information corresponding to the vehicle 1, and quality information indicating the communication quality in the transmission path 2.

More specifically, when the acquisition unit 410 has received vehicle measurement information from the measurement unit 30 in the master device 100 in the in-vehicle communication system 300 via the wireless base station device 402, the acquisition unit 410 acquires measurement information, quality information, and an elapsed time period, in the in-vehicle network 310 from the received vehicle measurement information.

The acquisition unit 410 stores, into the storage unit 440, the measurement result of a characteristic of the target cable 3 included in the acquired measurement information, as a measurement result of the characteristic of the transmission path 2. Hereinafter, the measurement result of a characteristic of a transmission path 2 will also be referred to as a "characteristic measurement result".

The acquisition unit 410 stores, into the storage unit 440, the acquired quality information, as the quality information indicating the communication quality in the transmission path 2.

The acquisition unit 410 stores the acquired elapsed time period into the storage unit 440.

In addition, based on the master ID and the slave ID included in the acquired measurement information, and the connection information in the storage unit 440, the acquisition unit 410 specifies the positions in the vehicle 1 of the master device 100 and the slave device 200, and stores mounting position information indicating the specified positions, into the storage unit 440.

When the acquisition unit 410 has received position information from the position detection device 160 in the in-vehicle communication system 300 via the wireless base station device 402, the acquisition unit 410 stores the received position information into the storage unit 440.

The acquisition unit 410 receives weather information of the region corresponding to the position of the vehicle 1 indicated by the received position information, from a server or the like of the Meteorological Agency via the external network 401, and stores the received weather information into the storage unit 440.

When the acquisition unit 410 has received temperature information from the temperature sensor 121 in the in-vehicle communication system 300 via the wireless base station device 402, the acquisition unit 410 stores the received temperature information into the storage unit 440 as temperature information indicating the temperature of the in-vehicle device connected to the transmission path 2.

For example, the acquisition unit 410 acquires characteristic measurement results, quality information, and mounting position information of a plurality of transmission paths 2 of a certain vehicle 1, and stores the acquired characteristic measurement results, quality information, and mounting position information into the storage unit 440. For example, the acquisition unit 410 acquires elapsed time periods, position information, weather information, and temperature information of a plurality of vehicles 1, and stores the acquired elapsed time periods, position information, weather information, and temperature information into the storage unit 440.

[Discrimination Unit]

The discrimination unit 420 performs a discrimination process of discriminating a factor of an abnormality of a transmission path 2, based on the characteristic measurement result, temperature information, and elapsed time period acquired by the acquisition unit 410.

More specifically, the discrimination unit 420 compares a characteristic measurement result of each of one or a plurality of transmission paths 2 in the storage unit 440 with a threshold Th being a predetermined value, and based on the comparison result, determines whether or not an abnormality has occurred in the transmission path 2.

Then, when the discrimination unit 420 has determined that an abnormality has occurred in the transmission path 2, the discrimination unit 420 discriminates a factor of the abnormality, based on the characteristic measurement result, the temperature information, and the elapsed time period. Hereinafter, a transmission path 2 being the target of the discrimination process performed by the discrimination unit 420 will also be referred to as a "target transmission path 2".

For example, based on a plurality of characteristic measurement results regarding a certain target transmission path 2 and accumulated in the storage unit 440, the discrimination unit 420 generates time series data of the characteristic measurement results, and based on the generated time series data, analyzes the tendency of deterioration of the target transmission path 2, the time in which the deterioration has advanced, and the like.

Based on the generated time series data, the temperature information, and the elapsed time period, the discrimination unit 420 specifies, for example, the temperature in the vehicle 1, aged deterioration of the target transmission path 2, or the like, as one factor of the abnormality of the target transmission path 2.

For example, the discrimination unit 420 discriminates a factor of the abnormality of the target transmission path 2, based on various types of information of at least one vehicle 1, out of various types of information of one or a plurality of vehicles 1, such as the characteristic measurement result acquired by the acquisition unit 410. The discrimination unit 420 performs the discrimination process, based on various types of information of a plurality of vehicles 1 of which the vehicle types are different, thereby specifying the structure of a vehicle 1 according to each vehicle type, as one factor of the abnormality of the target transmission path 2.

Another Example 1 of Discrimination Process

The discrimination unit 420 performs the discrimination process, further based on mounting position information in the storage unit 440.

For example, when the position of the target transmission path 2 indicated by the mounting position information is in a high temperature environment, such as in the vicinity of the engine, the discrimination unit 420 specifies the temperature around the target transmission path 2, as one factor of the abnormality of the target transmission path 2.

For example, based on the mounting position information and the connection information, the discrimination unit 420 specifies, as one factor of the abnormality of the target transmission path 2, a wiring environment such as extension of the target transmission path 2 in parallel to another transmission path 2, the curvature radius of a bent portion of the target transmission path 2, the binding place of the target transmission path 2, and the like.

Another Example 2 of Discrimination Process

The discrimination unit 420 performs the discrimination process, further based on the position information and the weather information in the storage unit 440.

For example, in a case where the use region of the vehicle 1 indicated by the position information and the weather information is a high temperature region, a region where temperature change is large, a high humidity region, or a salt damage region, the discrimination unit 420 specifies the use environment of the vehicle 1 as one factor of the abnormality of the target transmission path 2.

For example, in a case where the use region of the vehicle 1 indicated by the position information and the weather information is a region where a disaster such as a typhoon, a flood, or submerging under water has occurred, the discrimination unit 420 specifies these disasters as one factor of the abnormality of the target transmission path 2.

Another Example 3 of Discrimination Process

The discrimination unit 420 performs the discrimination process, further based on the quality information in the storage unit 440.

For example, based on a plurality of pieces of quality information regarding a certain target transmission path 2 and accumulated in the storage unit 440, the discrimination unit 420 generates time series data of communication quality in the target transmission path 2, and based on the generated time series data, analyzes the tendency of change in the communication quality in the target transmission path 2, the time in which the communication quality was deteriorated, and the like.

Then, the discrimination unit 420 performs the discrimination process, based on the generated time series data and other information such as the temperature information and the like acquired by the acquisition unit 410.

(Update of Deterioration Correspondence Information T2)

The discrimination unit 420 updates deterioration correspondence information T2, based on a result of the discrimination process.

For example, based on results of the discrimination process regarding each target transmission path 2 in a plurality of vehicles 1 of an identical vehicle type, the discrimination unit 420 alters the aged deterioration time period indicated by the deterioration degree in the deterioration correspondence information T2, to a more accurate value.

For example, when the deterioration correspondence information T2 has been updated by the discrimination unit 420, the delivery unit 430 transmits the updated deterioration correspondence information T2 to the master device 100 in the in-vehicle communication system 300 via the wireless base station device 402 and the TCU 150.

When the acquisition unit 40 in the master device 100 has received the updated deterioration correspondence information T2 from the delivery unit 430 in the server 400 via the communication unit 10, the acquisition unit 40 updates the deterioration correspondence information T2 in the storage unit 60 to the received deterioration correspondence information T2.

[Operation Flow]

Each device in the communication system according to the embodiment of the present disclosure includes a computer that includes a memory. An arithmetic processing unit such as a CPU in the computer reads out, from the memory, a program including a part or all of steps in the flow chart and sequence shown below, and executes the program. Programs of the plurality of devices can each be installed from outside. The programs of the plurality of devices are each distributed in a state of being stored in a storage medium.

Figure 8:
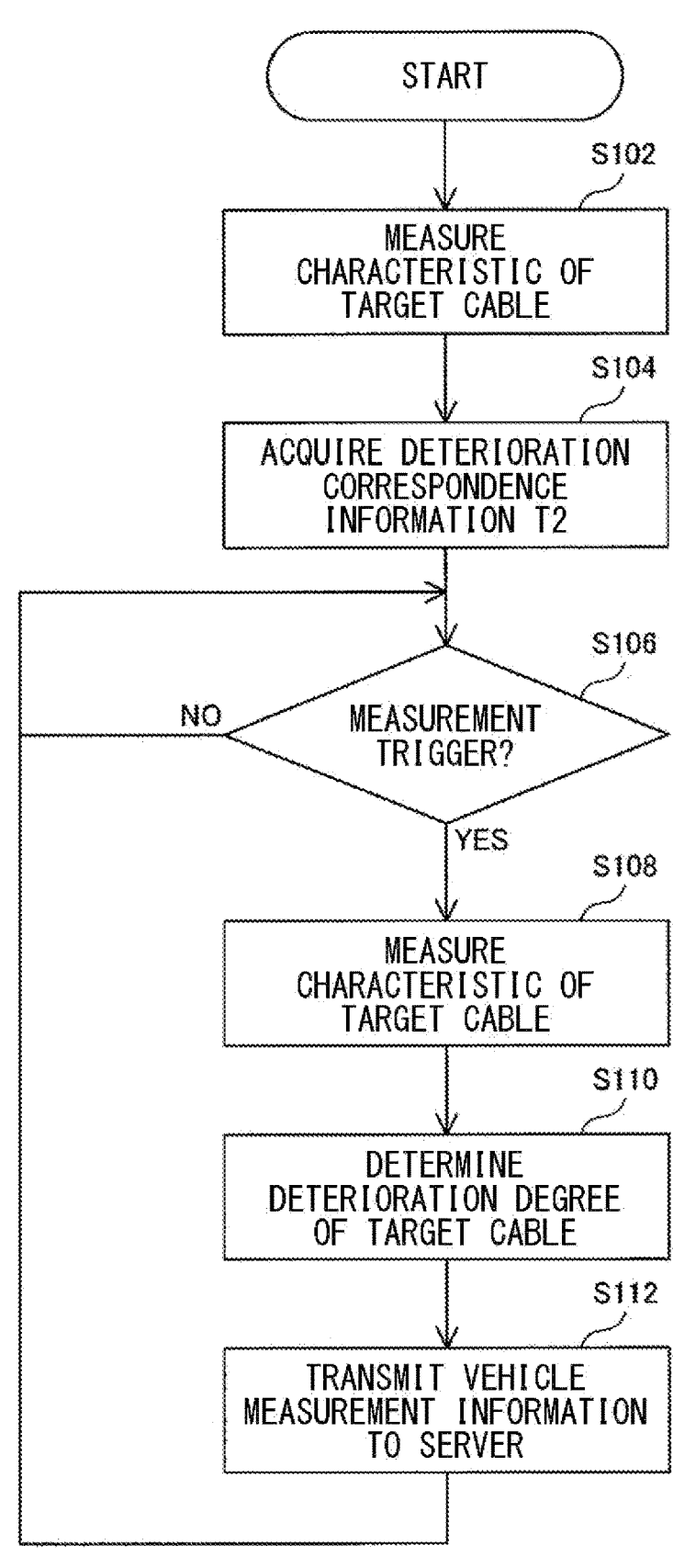
FIG. 8 is a flow chart describing an operation procedure according to which the master device determines the deterioration degree of a target cable in the in-vehicle communication system according to the first embodiment of the present disclosure.

FIG. 8 is a flow chart describing an operation procedure according to which the master device determines the deterioration degree of a target cable in the in-vehicle communication system according to the first embodiment of the present disclosure.

With reference to FIG. 8, first, the master device 100 measures a characteristic of a target cable 3 before shipment of the vehicle 1, for example (step S102).

Next, the master device 100 acquires, from the server 400, deterioration correspondence information T2 that corresponds to the characteristic of the target cable 3 (step S104).

Next, the master device 100 waits for a predetermined measurement trigger such as turning-on of an accessory power supply of the vehicle 1 after shipment of the vehicle 1, for example (NO in step S106), and at the predetermined measurement trigger (YES in step S106), measures the characteristic of the target cable 3 (step S108).

Next, based on the measurement result of the characteristic of the target cable 3 and the deterioration correspondence information T2, the master device 100 determines the deterioration degree of the target cable 3 (step S110).

Next, the master device 100 transmits, to the server 400, vehicle measurement information including quality information indicating the communication quality in the target cable 3, the elapsed time period from the time point of shipment of the vehicle 1, the measurement result of the characteristic of the target cable 3, the master ID, and a slave ID (step S112).

Next, the master device 100 waits for a new measurement trigger (NO in step S106).

The order of steps S110 and S112 is not limited to the above, and may be switched.

Figure 9:
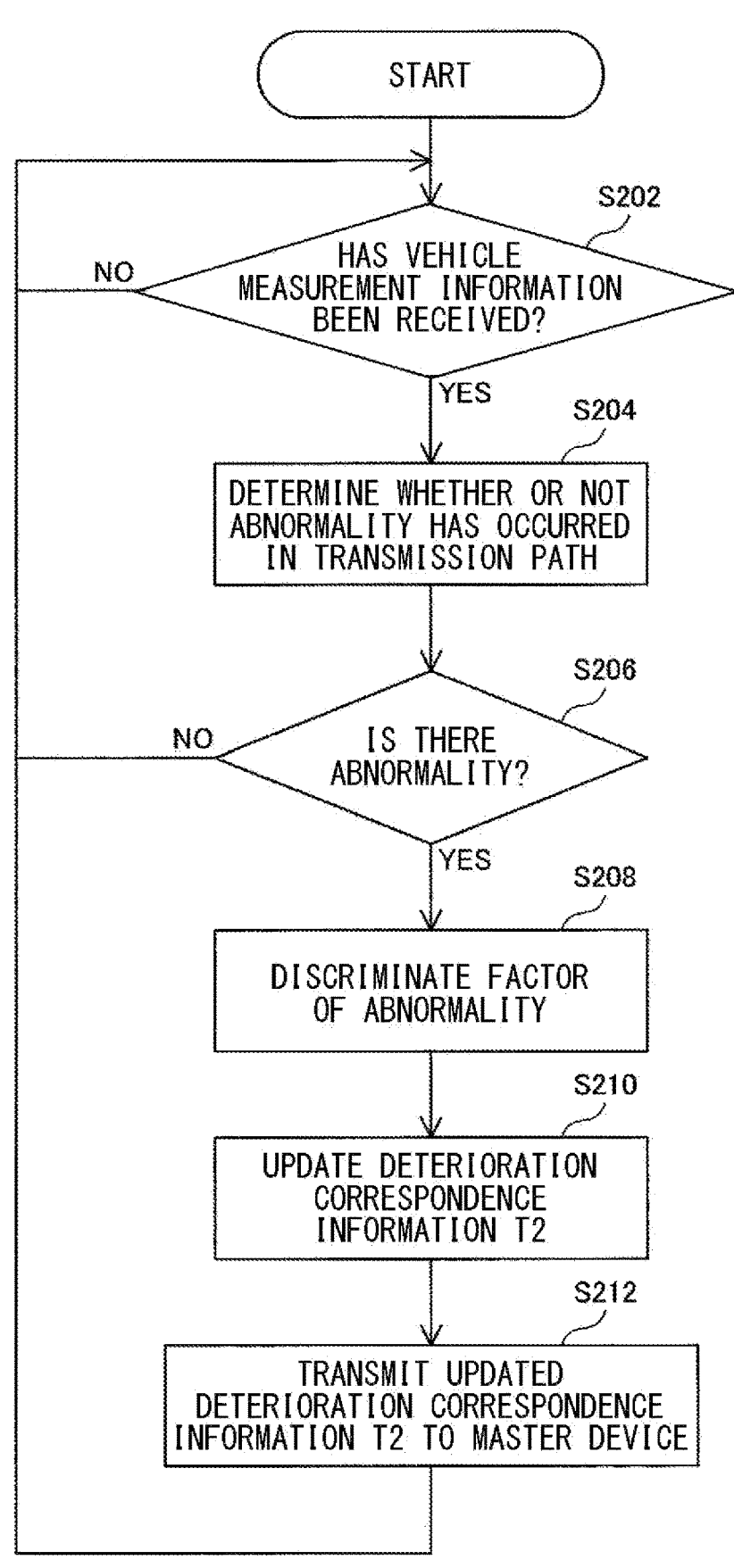
FIG. 9 is a flow chart describing an operation procedure according to which the server discriminates a factor of an abnormality of a transmission path in the in-vehicle communication system according to the first embodiment of the present disclosure.

FIG. 9 is a flow chart describing an operation procedure according to which the server discriminates a factor of an abnormality in a transmission path, in the in-vehicle communication system according to the first embodiment of the present disclosure.

With reference to FIG. 9, first, the server 400 waits for vehicle measurement information from the master device 100 in the in-vehicle communication system 300 (NO in step S202), and when having received vehicle measurement information (YES in step S202), the server 400 determines whether or not an abnormality has occurred in the transmission path 2, based on a characteristic measurement result included in the vehicle measurement information (step S204).

Next, when having determined that no abnormality has occurred in the transmission path 2 (NO in step S206), the server 400 waits for new vehicle measurement information from the master device 100 (NO in step S202).

Meanwhile, when having determined that an abnormality has occurred in the transmission path 2 (YES in step S206), the server 400 discriminates a factor of the abnormality of the transmission path 2, based on various types of information such as the characteristic measurement result and the elapsed time period included in the vehicle measurement information, the weather information of the region corresponding to the position of the vehicle 1, the mounting position information indicating the positions in the vehicle 1 of the master device 100 and the slave device 200, and the temperature information received from the temperature sensor 121 in the in-vehicle communication system 300 (step S208).

Next, based on the result of the discrimination process, the server 400 updates the deterioration correspondence information T2 (step S210).

Next, the server 400 transmits the updated deterioration correspondence information T2 to the master device 100 in the in-vehicle communication system 300 (step S212).

Next, the server 400 waits for new vehicle measurement information from the master device 100 (NO in step S202).

Figure 10:
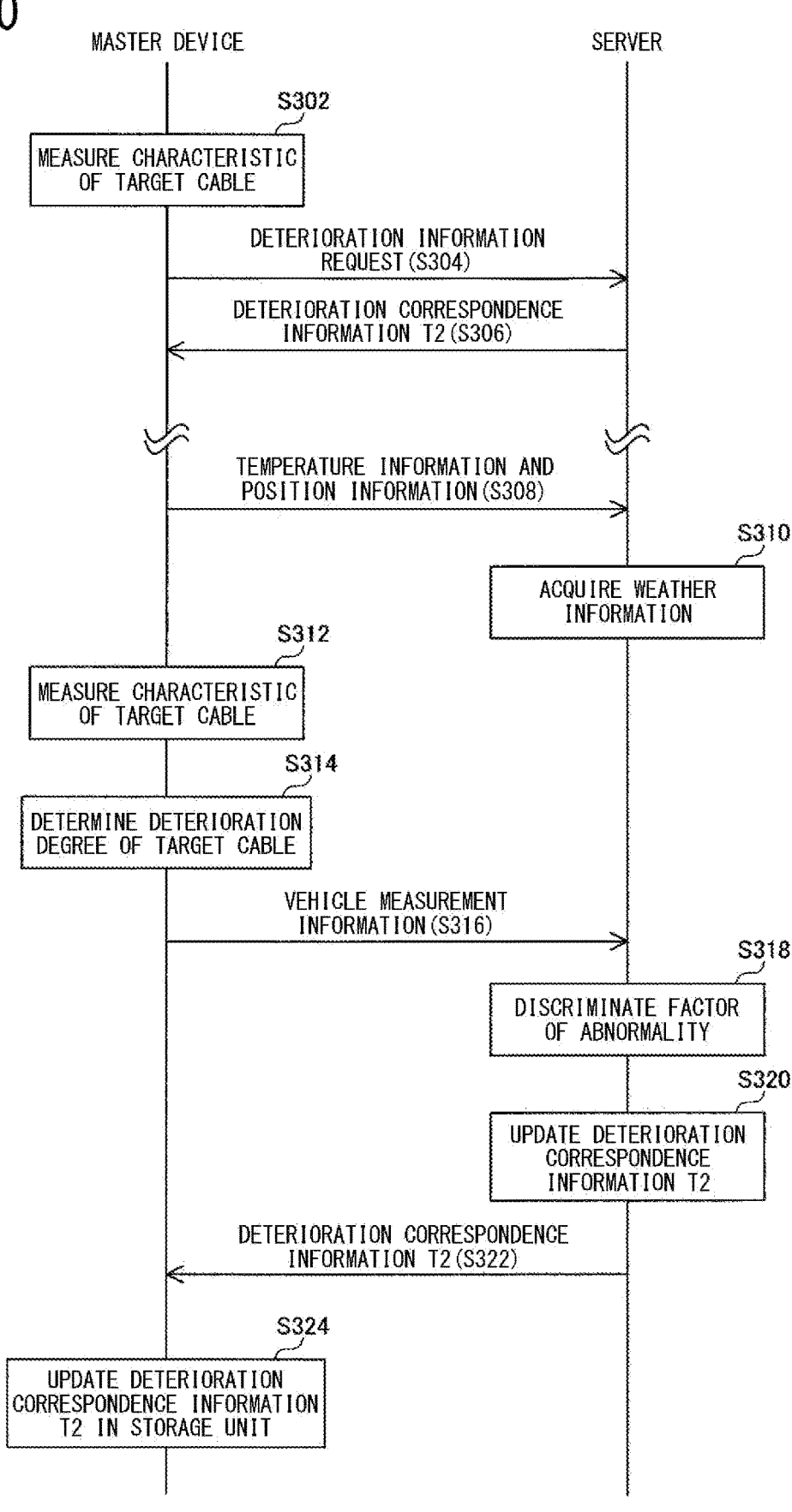
FIG. 10 shows an example of the sequence of a process of determining the deterioration degree of a transmission path and a process of discriminating a factor of an abnormality of the transmission path in the communication system according to the first embodiment of the present disclosure.

FIG. 10 shows an example of the sequence of a process of determining the deterioration degree of a transmission path and a process of discriminating a factor of an abnormality of the transmission path in the communication system according to the first embodiment of the present disclosure.

With reference to FIG. 10, first, the master device 100 measures a characteristic of a target cable 3 before shipment of the vehicle 1, for example (step S302).

Next, the master device 100 transmits, to the server 400, deterioration information request including a measurement result of the characteristic of the target cable 3 (step S304).

Next, the server 400 specifies a characteristic that matches or that is similar to the measurement result indicated by the deterioration information request received from the master device 100, and transmits deterioration correspondence information T2 that corresponds to the specified characteristic, to the master device 100 (step S306).

Next, for example, after shipment of the vehicle 1, the master device 100 transmits, to the server 400, temperature information indicating a measurement result of the temperature in the vehicle 1, and position information indicating the current position of the vehicle 1 (step S308).

Next, the server 400 acquires weather information of the region that corresponds to the position of the vehicle 1 indicated by the received position information (step S310). Next, the master device 100 measures the characteristic of the target cable 3 at a predetermined measurement trigger such as turning-on of an accessory power supply of the vehicle 1, or the like (step S312).

Next, based on the measurement result of the characteristic of the target cable 3 and the deterioration correspondence information T2, the master device 100 determines the deterioration degree of the target cable 3 (step S314).

Next, the master device 100 transmits, to the server 400, vehicle measurement information including quality information indicating the communication quality in the target cable 3, the elapsed time period from the time point of shipment of the vehicle 1, the measurement result of the characteristic of the target cable 3, the master ID of the master device 100, and a slave ID (step S316).

Next, when the server 400 has determined that an abnormality has occurred in the transmission path 2, based on the characteristic measurement result included in the vehicle measurement information, the server 400 discriminates a factor of the abnormality of the transmission path 2, based on various types of information such as the characteristic measurement result included in the vehicle measurement information, the weather information, the mounting position information indicating the positions in the vehicle 1 of the master device 100 and the slave device 200, and the temperature information (step S318).

Next, based on the result of the discrimination process, the server 400 updates the deterioration correspondence information T2 (step S320).

Next, the server 400 transmits the updated deterioration correspondence information T2 to the master device 100 in the in-vehicle communication system 300 (step S322).

Next, the master device 100 updates the deterioration correspondence information T2 in the storage unit 60 to the deterioration correspondence information T2 received from the server 400 (step S324).

In the master device 100 according to the first embodiment of the present disclosure, the acquisition unit 40 acquires the deterioration correspondence information T2 from the server 400 being a device outside the vehicle 1. However, the present disclosure is not limited thereto. The acquisition unit 40 may acquire the deterioration correspondence information T2 from an external device connected to the in-vehicle network 310 according to DoIP (Diagnostics over Internet Protocol), for example.

The acquisition unit 40 may acquire the deterioration correspondence information T2 from an in-vehicle device other than the master device 100 in the vehicle 1.

In the master device 100 according to the first embodiment of the present disclosure, the acquisition unit 40 acquires, as the deterioration information, the deterioration correspondence information T2 indicating the correspondence relationship between the characteristic of the target cable 3 and the deterioration degree of the target cable 3. However, the present disclosure is not limited thereto. The acquisition unit 40 may acquire, as the deterioration information, information indicating the correspondence relationship between the amount of change in the characteristic of the target cable 3 and the deterioration degree of the target cable 3.

In the server 400 according to the first embodiment of the present disclosure, the discrimination unit 420 performs the discrimination process, based on a measurement result of the characteristic, temperature information, an elapsed time period from a predetermined situation concerning the vehicle 1, mounting position information, position information, weather information, and quality information. However, the present disclosure is not limited thereto. The discrimination unit 420 may be configured not to use, in the discrimination process, a part or all of the mounting position information, the position information, the weather information, and the quality information.

Meanwhile, there is a desire for a technology that can realize an excellent function regarding each transmission path in an in-vehicle network.

For example, due to prevalence of shared cars and prevalence of automated driving technologies, it is predicted that the operation rate of vehicles owned by individuals will increase to exceed the current operation rate of about 5%, and the life cycles of automobile components become short. Therefore, there is a desire for a technology that can accurately determine the deterioration degree of each transmission path in an in-vehicle network and a technology that can accurately discriminate a factor of an abnormality of the transmission path in the in-vehicle network.

In this regard, in the master device 100 according to the first embodiment of the present disclosure, the measurement unit 30 measures a characteristic of the transmission path 2 in the in-vehicle network 310 mounted to the vehicle 1. The acquisition unit 40 acquires deterioration information which is information regarding deterioration of the transmission path 2 and which corresponds to the characteristic measured by the measurement unit 30. The determination unit 50 determines the deterioration degree of the transmission path

2, based on the characteristic measured by the measurement unit 30 and the deterioration information acquired by the acquisition unit 40.

A deterioration determination method according to the first embodiment of the present disclosure is a deterioration determination method performed in a master device 100 mounted to a vehicle 1. In this deterioration determination method, first, the master device 100 measures a characteristic of a transmission path 2 in the in-vehicle network 310 mounted to the vehicle 1. Next, the master device 100 acquires deterioration information which is information regarding deterioration of the transmission path 2 and which corresponds to the measured characteristic. Next, the master device 100 determines the deterioration degree of the transmission path 2, based on the measured characteristic and the acquired deterioration information.

In the configuration and method, as the deterioration information, for example, deterioration information that corresponds to the manufacturer or the like of the transmission path distinguishable based on a measurement result of a characteristic of the transmission path is acquired, and the deterioration degree of the transmission path is determined based on the measurement result and the acquired deterioration information. Accordingly, for example, the deterioration degree of the transmission path can be accurately determined for each manufacturer of the transmission path.

Therefore, in the master device and the deterioration determination method according to the first embodiment of the present disclosure, an excellent function regarding the transmission path in the in-vehicle network can be realized.

In the server 400 according to the first embodiment of the present disclosure, the acquisition unit 410 acquires a measurement result of a characteristic of a transmission path 2 in the in-vehicle network mounted to the vehicle 1, temperature information indicating the temperature of an in-vehicle device connected to the transmission path 2, and an elapsed time period from a predetermined situation concerning the vehicle 1. The discrimination unit 420 performs a discrimination process of discriminating a factor of an abnormality of the transmission path 2, based on the measurement result, the temperature information, and the elapsed time period, which have been acquired by the acquisition unit 410.

An abnormality factor discrimination method according to the first embodiment of the present disclosure is an abnormality factor discrimination method performed in the server 400. In this abnormality factor discrimination method, first, the server 400 acquires a measurement result of a characteristic of a transmission path 2 in the in-vehicle network 310 mounted to the vehicle 1, temperature information indicating the temperature of an in-vehicle device connected to the transmission path 2, and an elapsed time period from a predetermined situation concerning the vehicle 1. Next, the server 400 performs a discrimination process of discriminating a factor of an abnormality of the transmission path 2, based on the measurement result, the temperature information, and the elapsed time period, which have been acquired.

In the configuration and the method, the factor of an abnormality of the transmission path is discriminated based on the measurement result of the characteristic of the transmission path, the temperature information, and the elapsed time period. Accordingly, for example, factors of abnormalities such as deterioration in a high temperature environment, aged deterioration, and the like can be accurately discriminated.

Therefore, in the server and the abnormality factor discrimination method according to the first embodiment of the present disclosure, an excellent function regarding the transmission path in the in-vehicle network can be realized.

Next, another embodiment of the present disclosure will be described with reference to the drawings. In the drawings, the same or corresponding parts are denoted by the same reference signs, and descriptions thereof are not repeated.

Second Embodiment

The present embodiment relates to a communication system in which a change in a characteristic of a target cable 3 is detected and a discrimination process of discriminating a factor of the change is performed, when compared with the communication system according to the first embodiment. Contents other than those described below are the same as those in the in-vehicle communication system according to the first embodiment.

[Master Device]

Figure 11:
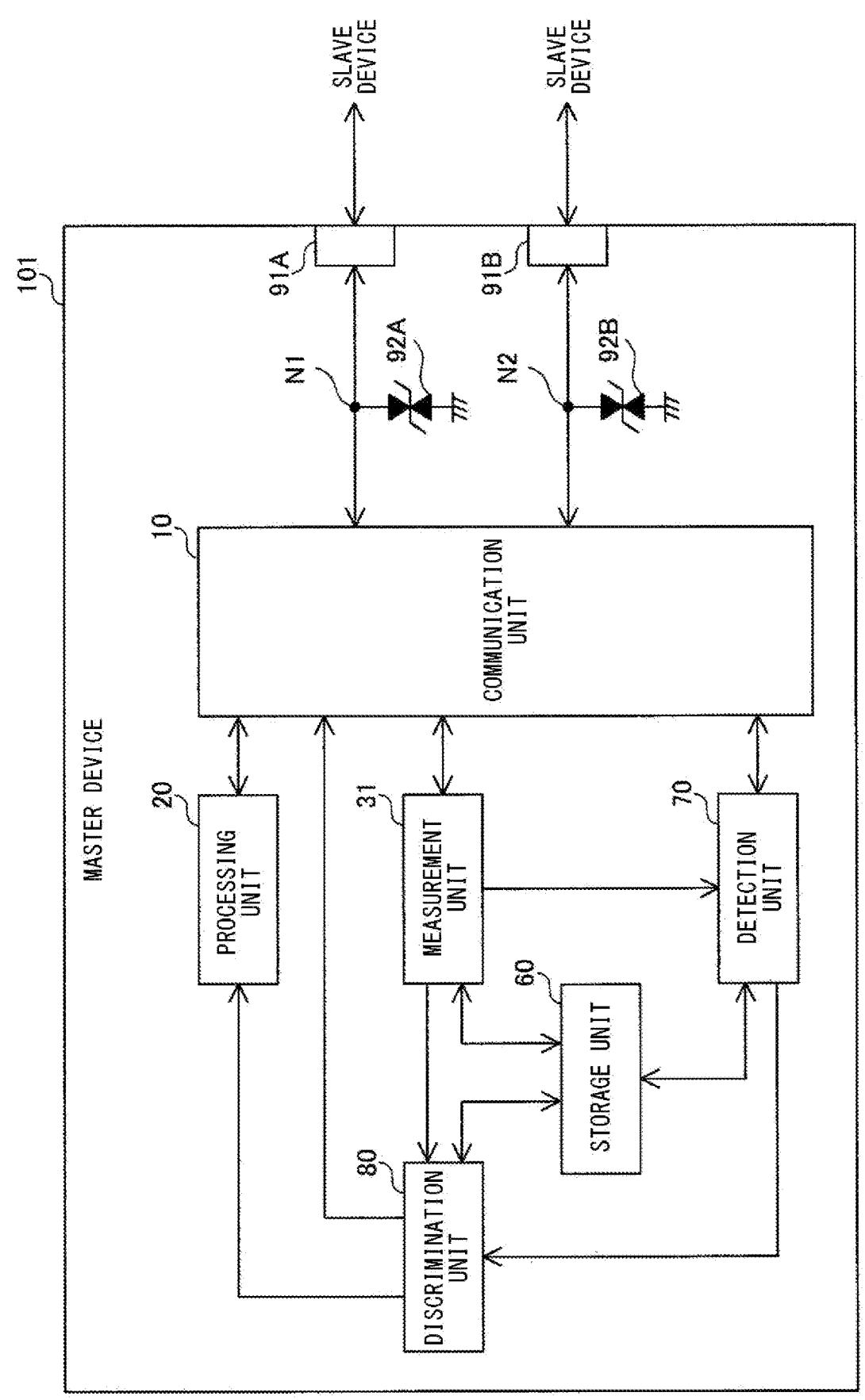
FIG. 11 shows a configuration of a master device according to a second embodiment of the present disclosure.

FIG. 11 shows a configuration of a master device according to a second embodiment of the present disclosure.

With reference to FIG. 11, a master device 101 includes a communication unit 10, a processing unit 20, a measurement unit 31, a detection unit 70, a discrimination unit 80, a storage unit 60, communication ports 91A, 91B, and front end circuits 92A, 92B.

The communication unit 10, the processing unit 20, the measurement unit 31, the detection unit 70, and the discrimination unit 80 are each realized by a processor such as a CPU or a DSP, for example. The storage unit 60 is a flash memory, for example.

The operation and function of the measurement unit 31 are the same as the operation and the function of the measurement unit 30 in the master device 100 according to the first embodiment, except that the measurement unit 31 outputs generated measurement information to the detection unit 70 and the discrimination unit 80.

The storage unit 60 has stored therein, for each of communication ports 91, a slave ID of each of one or a plurality of slave devices 200 connected via a target cable 3 to the communication ports 91 of the master device 101.

[Detection Unit]

The detection unit 70 detects a change in the topology of the in-vehicle network 310, based on a measurement result of a characteristic of the target cable 3 by the measurement unit 31.

More specifically, when the detection unit 70 has received measurement information from the measurement unit 31, the detection unit 70 acquires a slave ID included in the received measurement information, compares the acquired slave ID with a slave ID in the storage unit 60, and determines the presence/absence of a change in the topology of the in-vehicle network 310, based on the comparison result.

When the slave ID acquired from the measurement information is different from the slave ID in the storage unit 60, the detection unit 70 detects, as a change in the topology of the in-vehicle network 310, that an in-vehicle device connected to the communication port 91 in the master device 101 has been altered.

Specifically, for example, the detection unit 70 determines that, in place of the slave device 200 having been connected to the communication port 91 in the master device 101, another slave device 200 has been connected via the target cable 3.

Alternatively, the detection unit 70 determines that, in place of the slave device 200 having been connected to the communication port 91 in the master device 101 via the target cable 3, another slave device 200 has been connected via another target cable 3.

Every time the detection unit 70 receives measurement information from the measurement unit 31, the detection unit 70 notifies the discrimination unit 80 of a detection result of a change in the topology based on the received measurement information.

For example, when the detection unit 70 has detected that another slave device 200 has been connected to a communication port 91 in the master device 101, the detection unit 70 outputs, to the discrimination unit 80, detection information indicating that a topology change has been detected and including the slave ID of the other slave device 200.

The detection unit 70 updates a corresponding slave ID in the storage unit 60 to the slave ID of the other slave device 200 connected to the communication port 91 in the master device 101.

Meanwhile, when the detection unit 70 has determined that another slave device 200 is not connected to the master device 101, that is, the slave ID acquired from the measurement information matches the slave ID in the storage unit 60, the detection unit 70 outputs, to the discrimination unit 80, detection information indicating that no topology change has been detected.

[Discrimination Unit]

The discrimination unit 80 detects a change in a characteristic of a target cable 3, based on a characteristic measurement result by the measurement unit 31, and performs a discrimination process of discriminating a factor of the change.

More specifically, when having received measurement information from the measurement unit 31, the discrimination unit 80 acquires a measurement result of a characteristic of the target cable 3 included in the received measurement information, and accumulates the acquired measurement result into the storage unit 60, as one piece of time series data.

In addition, when having received measurement information from the measurement unit 31, the discrimination unit 80 compares the measurement result acquired from the received measurement information with an immediately-preceding measurement result in the time series data accumulated in the storage unit 60, to detect a change in the characteristic of the target cable 3.

For example, the discrimination unit 80 calculates the difference between the measurement result acquired from the measurement information and the immediately-preceding measurement result in the storage unit 60, and when the calculated difference is not less than a predetermined threshold, the discrimination unit 80 determines that the characteristic of the target cable 3 has changed, and performs a discrimination process.

For example, the storage unit 60 has stored therein a threshold ThA regarding the amount of change in the characteristic impedance of the target cable 3, and thresholds ThB, ThC regarding the absolute value of the characteristic impedance of the target cable 3. It is assumed that the threshold ThC is greater than the threshold ThB.

The discrimination unit 80 calculates a difference D1 between the measurement result of the characteristic impedance acquired from the measurement information and the measurement result of the immediately-preceding characteristic impedance in the storage unit 60, and when the difference D1 is greater than the threshold ThA, the discrimination unit 80 determines that the characteristic impedance of the target cable 3 has changed, and performs the discrimination process.

(Discrimination Process)

For example, in the discrimination process, the discrimination unit 80 selects one or a plurality of candidates out of a plurality of candidates of the factor of change in the characteristic impedance of the target cable 3.

For example, in the discrimination process, the discrimination unit 80 selects one or a plurality of candidates out of "topology alteration" being an alteration of the topology of the in-vehicle network 310, "unauthorized connection" being unauthorized in-vehicle device connection, "in-vehicle device failure" being a failure of an in-vehicle device, and "cable abnormality" being wire breakage or short circuit of the target cable 3. Hereinafter, each of "topology alteration", "unauthorized connection", "in-vehicle device failure", and "cable abnormality" will also be referred to as a factor candidate.

For example, when the vehicle 1 is traveling, the discrimination unit 80 excludes a part of the factor candidates from the selection target. More specifically, when the vehicle 1 is traveling, the discrimination unit 80 excludes predetermined factors, e.g., "topology alteration" and "unauthorized connection" among the factor candidates, from the selection target.

More specifically, when the discrimination unit 80 has determined that the vehicle 1 is traveling, based on a measurement result by a speed sensor or the like (not shown) mounted to the vehicle 1, the discrimination unit 80 excludes "topology alteration" and "unauthorized connection" among the factor candidates, from the selection target.

Then, as the factor of the change in the characteristic impedance of the target cable 3, the discrimination unit 80 selects two candidates, i.e., "in-vehicle device failure" and "cable abnormality" out of the factor candidates other than "topology alteration" and "unauthorized connection", for example.

Example 1 of Discrimination Result

When a change in the topology of the in-vehicle network 310 has been detected by the detection unit 70, the discrimination unit 80 determines that the factor of the change is a predetermined factor, irrespective of the measurement result of the characteristic impedance by the measurement unit 31.

More specifically, when the discrimination unit 80 has received, from the detection unit 70, detection information indicating that a topology change has been detected, the discrimination unit 80 selects, two candidates, i.e., topology alteration and unauthorized connection out of the factor candidates, as the factor of the change in the characteristic impedance of the target cable 3.

Example 2 of Discrimination Result

When the discrimination unit 80 has received, from the detection unit 70, detection information indicating that no topology change has been detected, the discrimination unit 80 selects three candidates, i.e., unauthorized connection, in-vehicle device failure, and cable abnormality out of the factor candidates, as the factor of the change in the characteristic impedance of the target cable 3.

Example 3 of Discrimination Result

When the discrimination unit 80 has received, from the detection unit 70, detection information indicating that no topology change has been detected, no slave ID is included in the measurement information received from the measurement unit 31, and the measurement result of the characteristic impedance acquired from the measurement information is less than the threshold ThB or greater than the threshold ThC, the discrimination unit 80 selects two candidates, i.e., in-vehicle device failure and cable abnormality out of the factor candidates, as the factor of the change in the characteristic impedance of the target cable 3. In this case, in particular, when the measurement result of the characteristic impedance acquired from the measurement information is less than the threshold ThB, the discrimination unit 80 determines that there is a possibility of short circuit of the target cable 3, and when the measurement result of the characteristic impedance acquired from the measurement information is greater than the threshold ThC, the discrimination unit 80 determines that there is a possibility of wire breakage of the target cable 3.

(Notification of Discrimination Result)

When the discrimination unit 80 has selected one or a plurality of candidates out of the factor candidates in the discrimination process, the discrimination unit 80 notifies the communication unit 10 of the discrimination result, i.e., the selection result of candidates, and notifies the user of the selection result by means of display or sound output in the vehicle 1.

For example, when having received from the discrimination unit 80 a notification of a selection result indicating in-vehicle device failure and cable abnormality, the communication unit 10 stops communication via the target cable 3 and starts communication via a redundant path including another Ethernet cable 3.

When the discrimination unit 80 has selected one or a plurality of candidates out of the factor candidates in the discrimination process, the discrimination unit 80 transmits selection information including the discrimination result, i.e., the selection result of candidates, to the server 400 via the communication unit 10 and the TCU 150.

For example, when having received, from the discrimination unit 80, selection information including a selection result indicating topology alteration and unauthorized connection, the server 400 specifies either one of authorized topology alteration and unauthorized connection as the factor. The server 400 transmits specification information indicating the specification result to the master device 101 in the in-vehicle communication system 300 via the wireless base station device 402 and the TCU 150. For example, when having specified authorized topology alteration as the factor, the server 400 transmits the deterioration correspondence information T2 to the master device 101, via the wireless base station device 402 and the TCU 150.

Upon receiving the specification information from the server 400 via the wireless base station device 402 and the TCU 150, the communication unit 10 acquires the specification result included in the received specification information.

When the factor of the change in the characteristic impedance of the target cable 3 indicated by the acquired specification result is authorized topology alteration, the communication unit 10 notifies the user that the topology of the in-vehicle network 310 has been altered, by means of display or sound output in the vehicle 1.

Meanwhile, when the factor of the change in the characteristic impedance of the target cable 3 indicated by the acquired specification result is unauthorized connection, the communication unit 10 stops transmission, to the slave device 200, of an Ethernet frame received from the processing unit 20 as well as output, to the processing unit 20, of an Ethernet frame received from the slave device 200.

[Operation Flow]

Figure 12:
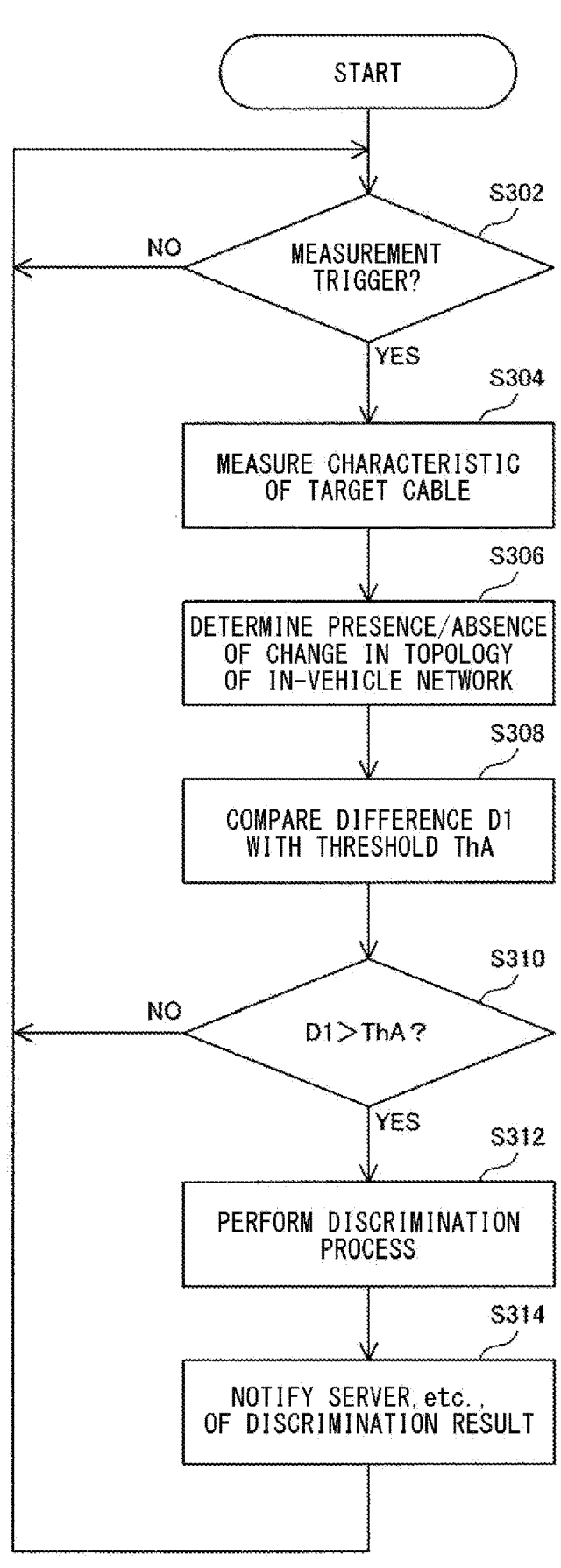
FIG. 12 is a flow chart describing an operation procedure according to which the master device in the in-vehicle communication system according to the second embodiment of the present disclosure discriminates a factor of change in a characteristic of a target cable.

FIG. 12 is a flow chart describing an operation procedure according to which the master device in the in-vehicle communication system according to the second embodiment of the present disclosure discriminates a factor of change in a characteristic of a target cable.

With reference to FIG. 12, first, the master device 101 waits for a predetermined measurement trigger such as turning-on of an accessory power supply of the vehicle 1 (NO in step S302), and at the predetermined measurement trigger (YES in step S302), measures a characteristic of the target cable 3, e.g., a characteristic impedance (step S304).

Next, based on a measurement result of the characteristic impedance of the target cable 3, the master device 101 determines the presence/absence of a change in the topology of the in-vehicle network 310 (step S306).

Next, the master device 101 calculates the difference D1 between the measurement result of the characteristic impedance and a measurement result of an immediately-preceding characteristic impedance, and compares the calculated difference D1 with the threshold ThA (step S308).

Next, when the difference D1 indicating the amount of change in the characteristic impedance of the target cable 3 is not greater than the threshold ThA (NO in step S310), the master device 101 waits for a new measurement trigger (NO in step S302).

Meanwhile, when the difference D1 indicating the amount of change in the characteristic impedance of the target cable 3 is greater than the threshold ThA (YES in step S310), the master device 101 determines that the characteristic impedance of the target cable 3 has changed and performs the discrimination process (step S312).

Next, the master device 101 notifies the server or the like of a discrimination result of the discrimination process (step S314).

Next, the master device 101 waits for a new measurement trigger (NO in step S302).

FIG. 13 is a flow chart describing an operation procedure according to which the master device in the in-vehicle communication system according to the second embodiment of the present disclosure performs the discrimination process. The flow chart in FIG. 13 shows details of step S312 in FIG. 12.

With reference to FIG. 13, first, the master device 101 determines whether or not the vehicle 1 is travelling (step S402).

Next, when having determined that the vehicle 1 is traveling (YES in step S404), the master device 101 excludes "topology alteration" and "unauthorized connection" among the factor candidates from the selection target, and selects two candidates, i.e., "in-vehicle device failure" and "cable abnormality", for example, as the factor of the change in the characteristic, e.g., the characteristic impedance, of the target cable 3 (step S406).

Meanwhile, when the master device 101 has determined that the vehicle 1 is not traveling (NO in step S404) and a change in the topology of the in-vehicle network 310 has been detected (YES in step S408), the master device 101 selects two candidates, i.e., "topology alteration" and "unauthorized connection", as the factor of the change in the characteristic impedance of the target cable 3 (step S410).

Meanwhile, when the master device 101 has determined that the vehicle 1 is not traveling (NO in step S404) and no change in the topology of the in-vehicle network 310 has been detected (NO in step S408), the master device 101 compares the measurement result of the characteristic impedance with the threshold ThB (step S412).

Next, when the measurement result of the characteristic impedance is smaller than the threshold ThB (YES in step S414), the master device 101 selects two candidates, i.e., "in-vehicle device failure" and "cable abnormality", as the factor of the change in the characteristic impedance of the target cable 3 (step S416).

Meanwhile, when the measurement result of the characteristic impedance is not less than the threshold ThB (NO in step S414), the master device 101 selects three candidates, i.e., "unauthorized connection", "in-vehicle device failure", and "cable abnormality", as the factor of the change in the characteristic impedance of the target cable 3 (step S418).

In the master device 101 according to the second embodiment of the present disclosure, the discrimination unit 80 selects one or plurality of candidates out of topology alteration, unauthorized connection, in-vehicle device failure, and cable abnormality in the discrimination process. However, the present disclosure is not limited thereto. The discrimination unit 80 may specify candidates other than topology alteration, unauthorized connection, in-vehicle device failure, and cable abnormality, as the factor of the change in the characteristic impedance of the target cable 3.

In the master device 101 according to the second embodiment of the present disclosure, when the discrimination unit 80 has received detection information from the detection unit 70, the discrimination unit 80 selects two candidates, i.e., topology alteration and unauthorized connection, out of the factor candidates, as the factor of the change in the characteristic impedance of the target cable 3, irrespective of the measurement result of the characteristic impedance in the measurement unit 31. However, the present disclosure is not limited thereto. The discrimination unit 80 may select a candidate other than topology alteration and unauthorized connection, based on the detection information and the measurement result of the characteristic impedance.

The master device 101 according to the second embodiment of the present disclosure may be configured not to be provided with the detection unit 70.

In the master device 101 according to the second embodiment of the present disclosure, when the vehicle 1 is traveling, the discrimination unit 80 excludes a part of the factor candidates from the selection target. However, the present disclosure is not limited thereto. Even when the vehicle 1 is traveling, the discrimination unit 80 may select one or a plurality of candidates out of all the factor candidates, without excluding a part of the factor candidates from the selection target.

In the master device 101 according to the second embodiment of the present disclosure, when the vehicle 1 is traveling, the discrimination unit 80 excludes "topology alteration" and "unauthorized connection" among the factor candidates, from the selection target. However, the present disclosure is not limited thereto. The discrimination unit 80 may be configured not to exclude at least one of "topology alteration" and "unauthorized connection" from the selection target even when the vehicle 1 is traveling.

Meanwhile, there is a desire for a technology that can realize an excellent function regarding each transmission path in an in-vehicle network.

For example, due to prevalence of shared cars, it is predicted that the life cycles of automobile components become short, and in addition, it is assumed that, in a shared car used by many and unspecified users, an unauthorized in-vehicle device is connected to an in-vehicle network. Therefore, there is a desire for a technology that can, when a characteristic of a transmission path in the in-vehicle network has changed, accurately discriminate a factor of the change.

In this regard, in the master device 101 according to the second embodiment of the present disclosure, the measurement unit 31 measures a characteristic of a transmission path 2 in the in-vehicle network 310 mounted to the vehicle 1. Based on a measurement result of the characteristic by the measurement unit 31, the discrimination unit 80 detects a change in the characteristic and performs a discrimination process of discriminating a factor of the change.

A change factor discrimination method according to the second embodiment of the present disclosure is a change factor discrimination method performed in the master device 101 mounted to the vehicle 1. In this change factor discrimination method, first, the master device 101 measures a characteristic of a transmission path 2 in the in-vehicle network 310 mounted to the vehicle 1. Next, based on a measurement result of the characteristic, the master device 101 detects a change in the characteristic, and performs a discrimination process of discriminating a factor of the change.

In the configuration and method, the factor of the change in the characteristic of the transmission path is discriminated based on a measurement result of the characteristic of the transmission path. Therefore, wire breakage of the transmission path, a change in the length of the transmission path, and the like can be accurately discriminated as the factor of the change in the characteristic of the transmission path, for example.

Therefore, in the master device and the change factor discrimination method according to the second embodiment of the present disclosure, an excellent function regarding the transmission path in the in-vehicle network can be realized.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

An in-vehicle device mounted to a vehicle, the in-vehicle device comprising:

a measurement unit configured to measure a characteristic of a transmission path in an in-vehicle network mounted to the vehicle;

an acquisition unit configured to acquire deterioration information which is information regarding deterioration of the transmission path and which corresponds to the characteristic measured by measurement unit; and a determination unit configured to determine a deterioration degree of the transmission path, based on the characteristic measured by measurement unit and the deterioration information acquired by the acquisition unit, wherein the acquisition unit acquires, as the deterioration information, deterioration correspondence information indicating a correspondence relationship between the characteristic and the deterioration degree, and the acquisition unit acquires the deterioration correspondence information that corresponds to the characteristic measured by the measurement unit, out of a plurality of pieces of the deterioration correspondence information that correspond to a plurality of the characteristics, each piece of the deterioration correspondence information being provided according to a corresponding manufacturer of the transmission path and a corresponding wiring state of the transmission path.

[Additional Note 2]

An in-vehicle device mounted to a vehicle, the in-vehicle device comprising:

a measurement unit configured to measure a characteristic of a transmission path in an in-vehicle network mounted to the vehicle; and a discrimination unit configured to, based on a measurement result of the characteristic by the measurement unit, detect a change in the characteristic, and perform a discrimination process of discriminating a factor of the change, wherein the discrimination unit selects, in the discrimination process, one or a plurality of candidates out of an alteration of a topology of the in-vehicle network, connection between the in-vehicle device and an unauthorized in-vehicle device, a failure of the in-vehicle device, and an abnormality of the transmission path, which are candidates of the factor.

[Additional Note 3]

A management device comprising:

an acquisition unit configured to acquire a measurement result of a characteristic of a transmission path in an in-vehicle network mounted to a vehicle, temperature information indicating a temperature of an in-vehicle device connected to the transmission path, and an elapsed time period from a predetermined situation concerning the vehicle; and a discrimination unit configured to perform a discrimination process of discriminating a factor of an abnormality of the transmission path, based on the measurement result, the temperature information, and the elapsed time period, which have been acquired by the acquisition unit, wherein based on the measurement result, the temperature information, and the elapsed time period in each of a plurality of the vehicles, the discrimination unit discriminates a factor of an abnormality of the transmission path in at least one vehicle among the plurality of the vehicles.

REFERENCE SIGNS LIST 1 vehicle
2 transmission path
3 Ethernet cable
10 communication unit
20 processing unit
30 measurement unit 31 measurement unit
40 acquisition unit
50 determination unit
60 storage unit
70 detection unit
80 discrimination unit
91 communication port
92 front end circuit
100 master device
101 master device
110 switch device
120 millimeter wave sensor
121 temperature sensor
130 automated driving ECU
140 driving control ECU
150 TCU
160 position detection device
200 slave device
300 in-vehicle communication system
310 in-vehicle network
400 server
401 external network
402 wireless base station device
410 acquisition unit
420 discrimination unit
430 delivery unit
440 storage unit
500 communication system

The invention claimed is:

1. An in-vehicle device mounted to a vehicle, the in-vehicle device comprising:

a processor configured to:

measure a characteristic of a transmission path in an in-vehicle network mounted to the vehicle; and based on a measurement result of the characteristic, detect a change in the characteristic, and perform a discrimination process of discriminating a factor of the change, wherein in the discrimination process, the processor selects one or more candidates out of a plurality of candidates of the factor as a selection target, the selection target determined as being the factor of the change, and when the vehicle is traveling, in the discrimination process, the processor selects the one or more candidates out of the plurality of candidates from which a part of the plurality of candidates that is an unauthorized connection and a topology alteration is excluded, and determines, as the factor of the change, the one or more candidates selected as the selection target.

* * * * *